US012652676B2

(12) United States Patent     (10) Patent No.:   US 12,652,676 B2

Zhou et al.     (45) Date of Patent:    Jun. 9, 2026

(54) DOWNLINK CONTROL INFORMATION BASED UNIFIED TRANSMISSION CONFIGURATION INDICATOR ACKNOWLEDGEMENT

(71) Applicant: QUALCOMM INCORPORATED, San Diego, CA (US)

(72) Inventors: Yan Zhou, San Diego, CA (US); Fang Yuan, Beijing (CN); Sony Akkarakaran, Poway, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 209 days.

(21) Appl. No.: 18/254,117

(22) PCT Filed: Jan. 8, 2021

(86) PCT No.: PCT/CN2021/070790

§ 371 (c)(1),
(2) Date: May 23, 2023

(87) PCT Pub. No.: WO2022/147744

PCT Pub. Date: Jul. 14, 2022

(65) Prior Publication Data

US 2024/0032061 A1     Jan. 25, 2024

(51) Int. Cl.
*H04W 72/232*     (2023.01)
*H04L 1/00*     (2006.01)
     (Continued)

(52) U.S. Cl.
CPC ......... *H04W 72/232* (2023.01); *H04L 1/0008* (2013.01); *H04L 1/1812* (2013.01); *H04L 5/0053* (2013.01); *H04W 72/1268* (2013.01)

(58) Field of Classification Search
CPC ............ H04W 72/232; H04W 72/1268; H04L 1/0008; H04L 1/1812; H04L 5/0053;
     (Continued)

(56) References Cited

U.S. PATENT DOCUMENTS

| | | | |
|---|---|---|---|
| 11,039,465 B2 | 6/2021 | Huang et al. | |
| 11,716,174 B2 * | 8/2023 | Zhou ..................... | H04L 5/0094 |
| | | | 370/329 |

(Continued)

FOREIGN PATENT DOCUMENTS

| | | |
|---|---|---|
| CN | 111201807 A | 5/2020 |
| CN | 111615805 A | 9/2020 |

(Continued)

OTHER PUBLICATIONS

OPPO: "Enhancements on Multi-Beam Operation", 3GPP TSG RAN WG1 #103-e, R1-2008217, 3rd Generation Partnership Project, Mobile Competence Centre, 650, Route Des Lucioles, F-06921 Sophia-Antipolis Cedex, France, vol. Ran WG1, No. e-Meeting, Oct. 26, 2020-Nov. 13, 2020, Oct. 24, 2020, 11 Pages, XP051946584, figure 1, Section 2.1, Section 2.3.

(Continued)

*Primary Examiner* — Kevin T Bates
*Assistant Examiner* — Poonam Sharma
(74) *Attorney, Agent, or Firm* — QUALCOMM Incorporated

(57)      ABSTRACT

Methods, systems, and devices for wireless communications are described. A unified transmission configuration indicator (TCI) framework may be implemented by a wireless communication system may support joint common TCI states for downlink and uplink channels or reference signals associated with communications between devices. A base station may transmit downlink control information (DCI) to a user equipment (UE) indicating the one or more TCI states and (Continued)

a scheduling for a downlink channel. The UE may transmit an acknowledgment message that is either an explicit acknowledgement or an implicit acknowledgment to confirm whether the one or more TCI states were successfully received in the DCI.

35 Claims, 22 Drawing Sheets

(51) Int. Cl.
    *H04L 1/1812*      (2023.01)
    *H04L 5/00*        (2006.01)
    *H04W 72/1268*    (2023.01)

(58) Field of Classification Search
    CPC ... H04L 1/1614; H04L 1/1854; H04L 1/1861;
                H04L 5/0025; H04L 5/0055; H04L
                        5/0094; H04L 1/1896
    See application file for complete search history.

(56) References Cited

U.S. PATENT DOCUMENTS

| | | | | |
|---|---|---|---|---|
| 11,877,265 | B2 * | 1/2024 | Guan | .................... H04L 5/0023 |
| 2020/0229169 | A1 | 7/2020 | John Wilson et al. | |
| 2020/0314881 | A1 | 10/2020 | Bagheri et al. | |
| 2020/0374045 | A1 * | 11/2020 | Yin | ..................... H04B 7/0456 |
| 2023/0328755 | A1 * | 10/2023 | Guo | .................. H04B 7/06968 |
| | | | | 370/329 |
| 2023/0379932 | A1 * | 11/2023 | Matsumura | ....... H04W 72/1263 |
| 2024/0072981 | A1 * | 2/2024 | Zhu | ....................... H04L 5/0094 |

FOREIGN PATENT DOCUMENTS

| | | | | |
|---|---|---|---|---|
| EP | 4275308 | A1 | 11/2023 | |
| KR | 20230117349 | A * | 8/2023 | ......... H04B 7/06952 |
| WO | WO-2019140041 | | 7/2019 | |
| WO | 2022082472 | A1 | 4/2022 | |
| WO | WO-2022144861 | A1 * | 7/2022 | ........... H04L 5/0053 |

OTHER PUBLICATIONS

Supplementary European Search Report—EP21916800—Search Authority—The Hague—Jun. 17, 2024.

Ad-Hoc Chair (Samsung): "Session Notes for 8.1 (Further Enhancements on MIMO for NR)," 3GPP TSG RAN WG1 Meeting #103-e, R1-2009832, e-Meeting, Oct. 26-Nov. 13, 2020, (Nov. 13, 2020), Section 8.1.1, 17 pages.

International Search Report and Written Opinion—PCT/CN2021/070790—ISA/EPO—Sep. 28, 2021.

Moderator (Samsung): "Moderator Summary for Multi-Beam Enhancement", 3GPP Draft, 3GPP Tsg Ran WG1 #103-e, R1-2008147, e-Meeting, Oct. 26 - Nov. 13, 2020, (2020-11-13), XP051950269, 30 p. Retrieved from the Internet: URL: https://ftp.3gpp.org/tsg_ran/WG1_RL1/TSGR1_103-e/Docs/R1-2008147.zip [Retrieved on 2020-11-03] proposal 3 . 1, p. 12 p. 13, Section 3.3, p. 25, Apple.

OPPO: "Enhancements on Multi-Beam Operation", 3GPP TSG RAN WG1 #103-e, R1-2008217, e-Meeting, Oct. 26th-Nov. 13th, 2020, 11 Pages, The whole document.

* cited by examiner

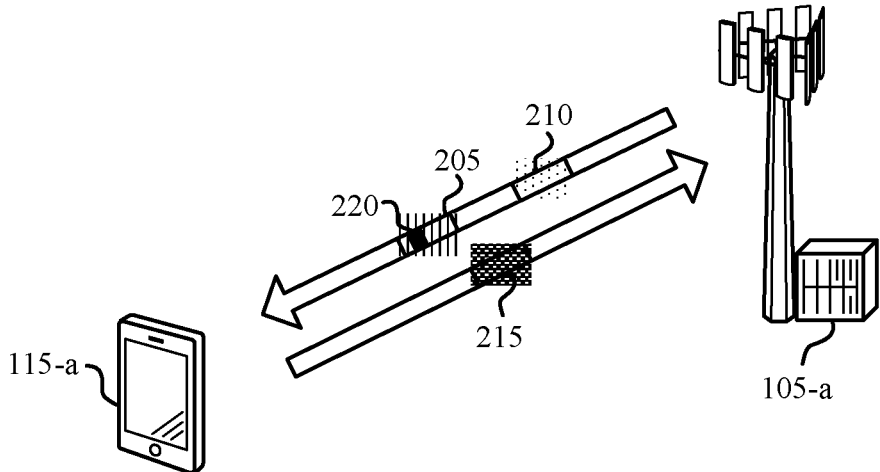
115-a
210
205
220
215
105-a
200
FIG. 2

105-b 115-b

Operate using first TCI state — 305

310 — DCI and Unified TCI

315 — PDSCH

ACK to PDSCH

PUCCH (Acknowledgement)

320

325

Apply second TCI state — 330

300

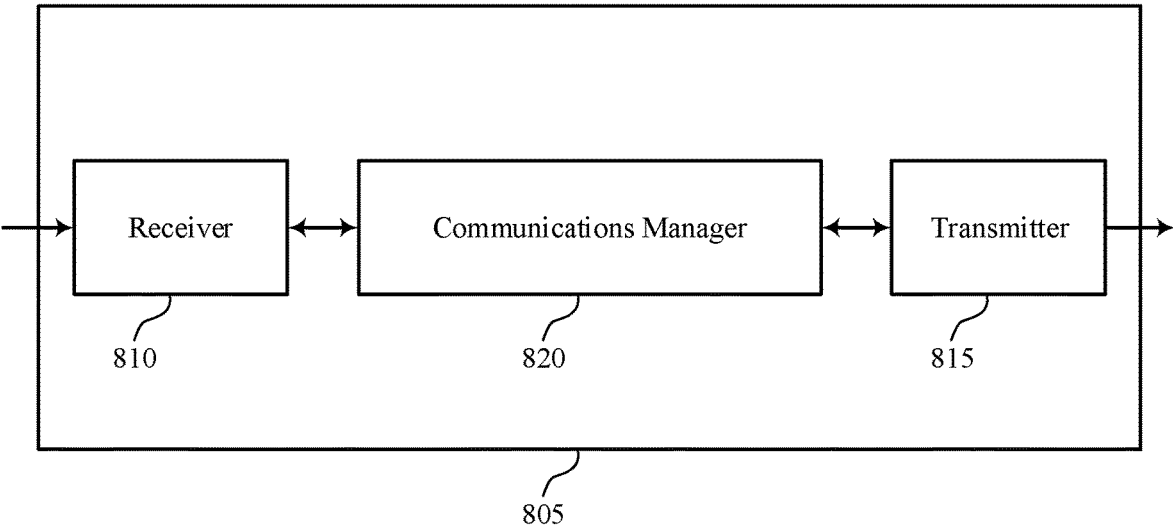
810
820
815
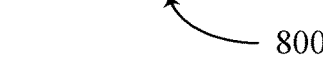
805
800
FIG. 8

1210

1220

1215

1205

1200

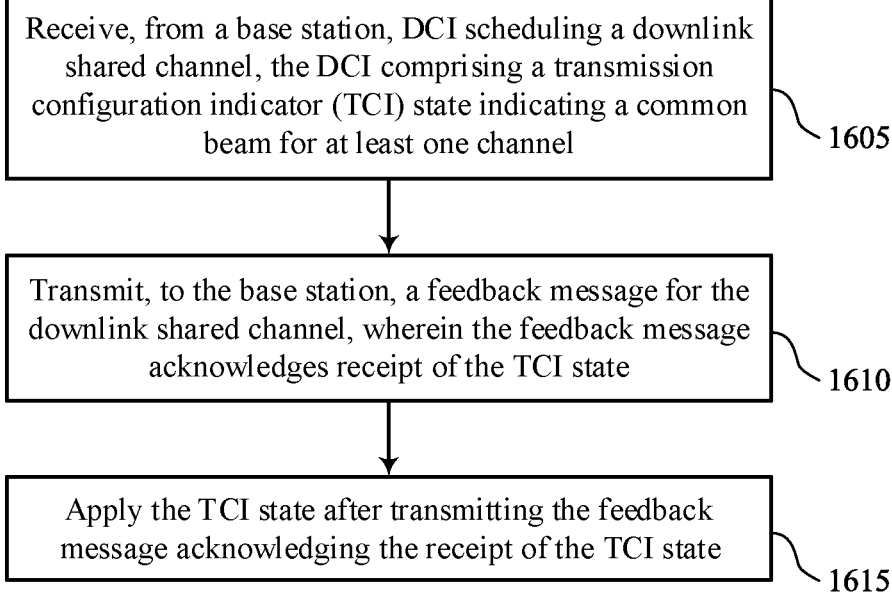

Receive, from a base station, DCI scheduling a downlink shared channel, the DCI comprising a transmission configuration indicator (TCI) state indicating a common beam for at least one channel
1605

Transmit, to the base station, a feedback message for the downlink shared channel, wherein the feedback message acknowledges receipt of the TCI state
1610

Apply the TCI state after transmitting the feedback message acknowledging the receipt of the TCI state
1615

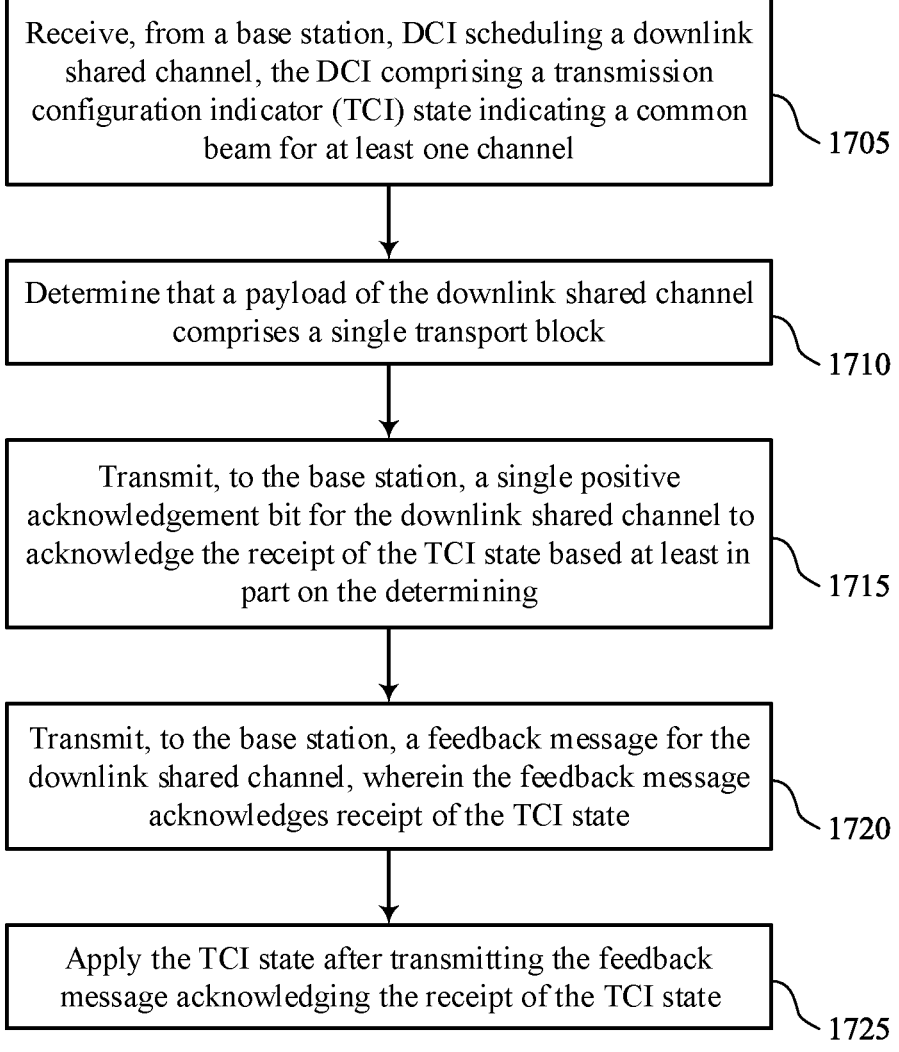

Receive, from a base station, DCI scheduling a downlink shared channel, the DCI comprising a transmission configuration indicator (TCI) state indicating a common beam for at least one channel

1705

Determine that a payload of the downlink shared channel comprises a single transport block

1710

Transmit, to the base station, a single positive acknowledgement bit for the downlink shared channel to acknowledge the receipt of the TCI state based at least in part on the determining

1715

Transmit, to the base station, a feedback message for the downlink shared channel, wherein the feedback message acknowledges receipt of the TCI state

1720

Apply the TCI state after transmitting the feedback message acknowledging the receipt of the TCI state

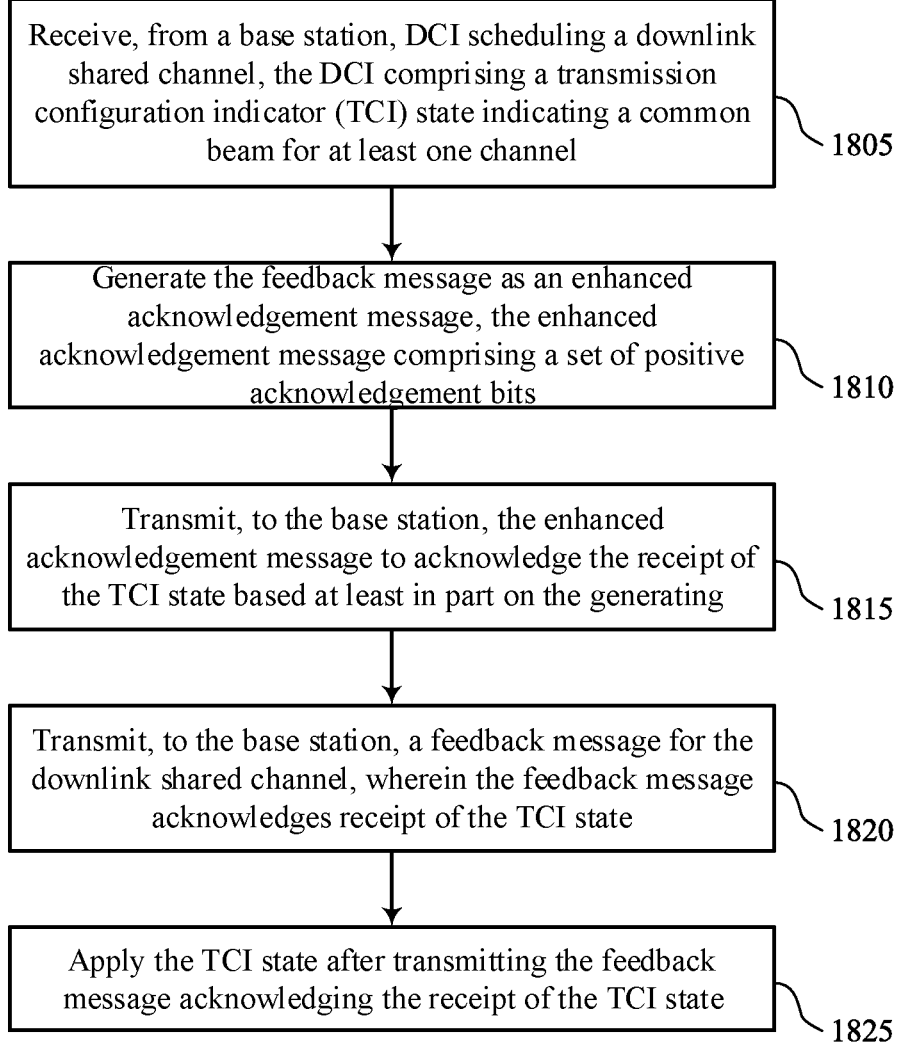

Receive, from a base station, DCI scheduling a downlink shared channel, the DCI comprising a transmission configuration indicator (TCI) state indicating a common beam for at least one channel

1805

Generate the feedback message as an enhanced acknowledgement message, the enhanced acknowledgement message comprising a set of positive acknowledgement bits

1810

Transmit, to the base station, the enhanced acknowledgement message to acknowledge the receipt of the TCI state based at least in part on the generating

1815

Transmit, to the base station, a feedback message for the downlink shared channel, wherein the feedback message acknowledges receipt of the TCI state

1820

Apply the TCI state after transmitting the feedback message acknowledging the receipt of the TCI state

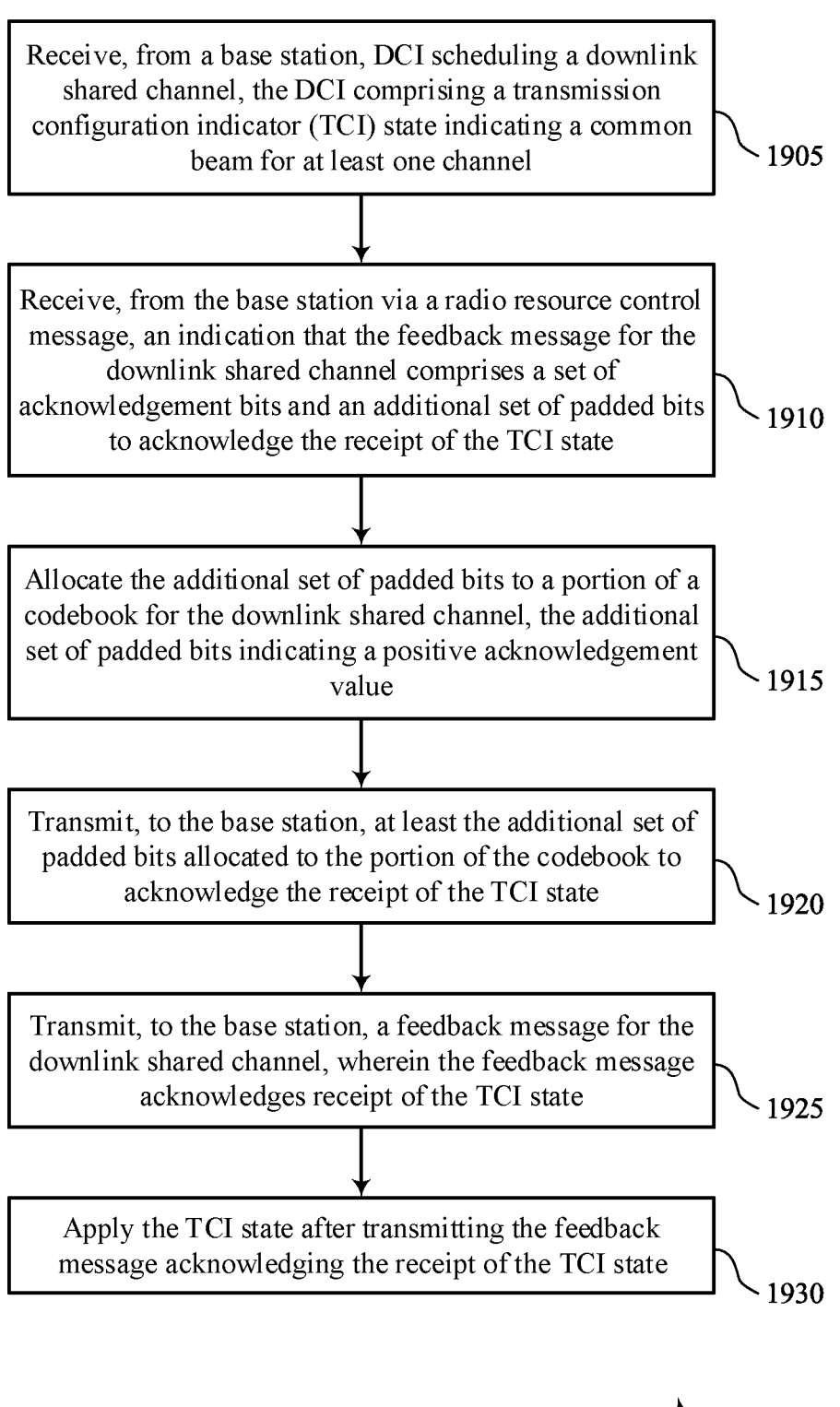

Receive, from a base station, DCI scheduling a downlink shared channel, the DCI comprising a transmission configuration indicator (TCI) state indicating a common beam for at least one channel ⟍ 1905

Receive, from the base station via a radio resource control message, an indication that the feedback message for the downlink shared channel comprises a set of acknowledgement bits and an additional set of padded bits to acknowledge the receipt of the TCI state ⟍ 1910

Allocate the additional set of padded bits to a portion of a codebook for the downlink shared channel, the additional set of padded bits indicating a positive acknowledgement value ⟍ 1915

Transmit, to the base station, at least the additional set of padded bits allocated to the portion of the codebook to acknowledge the receipt of the TCI state ⟍ 1920

Transmit, to the base station, a feedback message for the downlink shared channel, wherein the feedback message acknowledges receipt of the TCI state ⟍ 1925

Apply the TCI state after transmitting the feedback message acknowledging the receipt of the TCI state ⟍ 1930

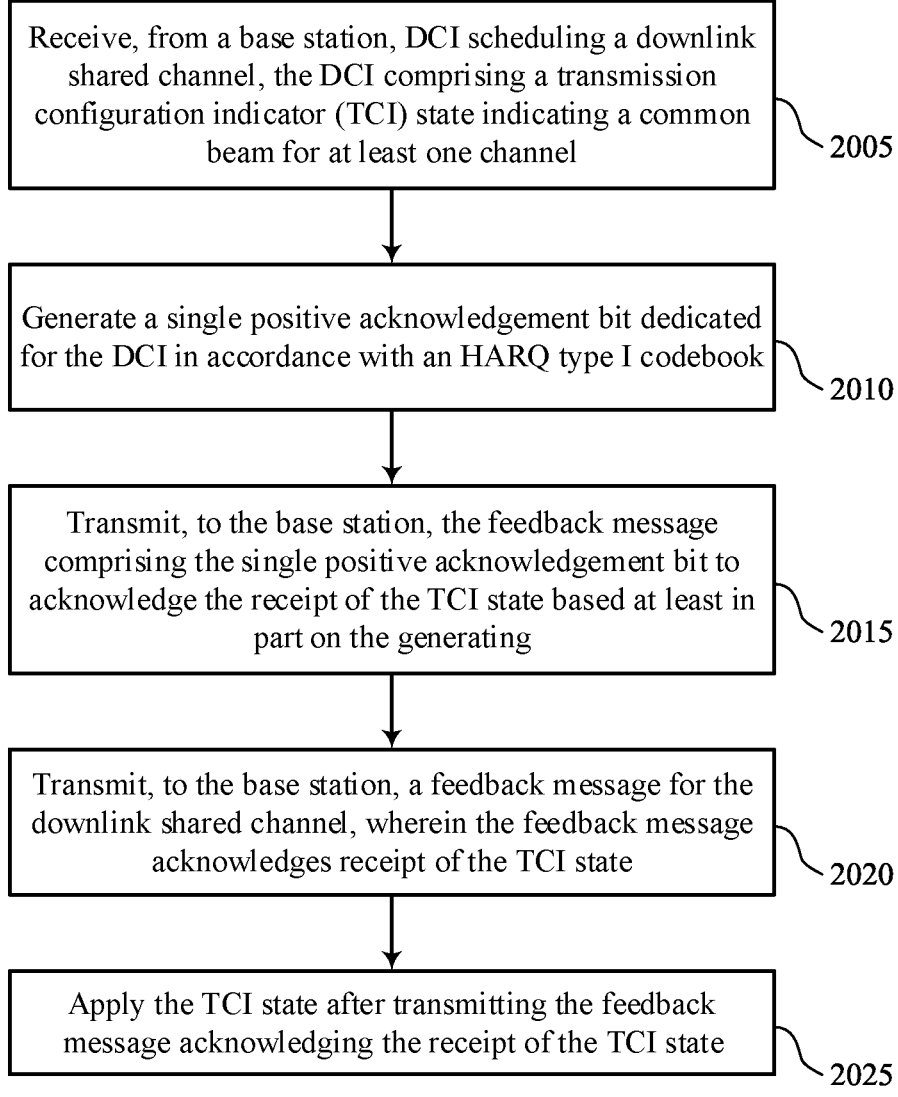

Receive, from a base station, DCI scheduling a downlink shared channel, the DCI comprising a transmission configuration indicator (TCI) state indicating a common beam for at least one channel

2005

Generate a single positive acknowledgement bit dedicated for the DCI in accordance with an HARQ type I codebook

2010

Transmit, to the base station, the feedback message comprising the single positive acknowledgement bit to acknowledge the receipt of the TCI state based at least in part on the generating

2015

Transmit, to the base station, a feedback message for the downlink shared channel, wherein the feedback message acknowledges receipt of the TCI state

2020

Apply the TCI state after transmitting the feedback message acknowledging the receipt of the TCI state

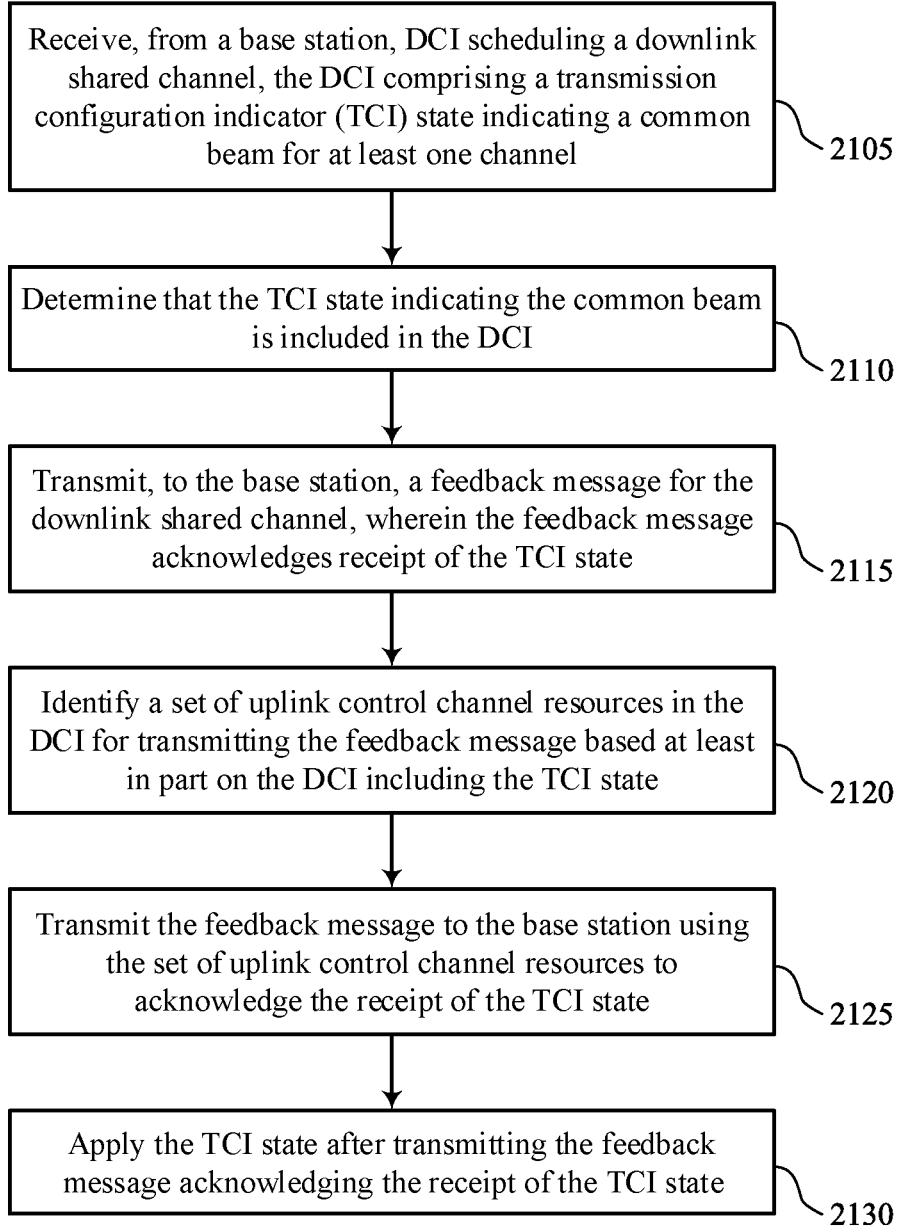

Receive, from a base station, DCI scheduling a downlink shared channel, the DCI comprising a transmission configuration indicator (TCI) state indicating a common beam for at least one channel

2105

Determine that the TCI state indicating the common beam is included in the DCI

2110

Transmit, to the base station, a feedback message for the downlink shared channel, wherein the feedback message acknowledges receipt of the TCI state

2115

Identify a set of uplink control channel resources in the DCI for transmitting the feedback message based at least in part on the DCI including the TCI state

2120

Transmit the feedback message to the base station using the set of uplink control channel resources to acknowledge the receipt of the TCI state

2125

Apply the TCI state after transmitting the feedback message acknowledging the receipt of the TCI state

Transmit, to a UE, DCI scheduling a downlink shared channel, the DCI comprising a transmission configuration indicator (TCI) state indicating a common beam for at least one channel

2205

Receive, from the UE, a feedback message for the downlink shared channel, wherein the feedback message acknowledges receipt of the TCI state by the UE

2210

2200

DOWNLINK CONTROL INFORMATION BASED UNIFIED TRANSMISSION CONFIGURATION INDICATOR ACKNOWLEDGEMENT

CROSS REFERENCE

The present application is a 371 national stage filing of International PCT Application No. PCT/CN2021/070790 by ZHOU et al. entitled "DOWNLINK CONTROL INFORMATION BASED UNIFIED TRANSMISSION CONFIGURATION INDICATOR ACKNOWLEDGEMENT," filed Jan. 8, 2021, which is assigned to the assignee hereof, and which is expressly incorporated by reference in its entirety herein.

FIELD OF TECHNOLOGY

The following relates to wireless communications, including downlink control information (DCI) based unified transmission configuration indicator (TCI) acknowledgement.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications networks may utilize a unified transmission configuration indicator (TCI) framework to support beamformed communications between devices. Conventional techniques related to the receipt and implementation of such TCI information may be deficient, which may result in ineffective implementation of the TCI information.

SUMMARY

The described techniques relate to improved methods, systems, devices, and apparatuses that support downlink control information (DCI) based unified transmission configuration indicator (TCI) acknowledgement. Generally, the described techniques provide for a wireless device such as a user equipment (UE) to explicitly or implicitly acknowledge receipt of one or more TCI states of a unified TCI framework implemented by a wireless communications system. The unified TCI framework may support a joint common TCI state which indicates a common beam for at least one downlink channel (or downlink reference signal transmission) and at least one uplink channel (or uplink reference signal transmission). A downlink common TCI state may indicate a common beam used for at least two downlink channels and an uplink common TCI state may indicate a common beam used for at least two uplink channels. In some examples, a base station may transmit DCI to a user equipment (UE) to indicate the unified TCI framework and a scheduling for a downlink channel.

In some examples, the UE may decode the DCI that schedules a downlink channel successfully but may fail to decode the scheduled downlink channel, or the UE may partially decode the scheduled downlink channel. In such examples, the UE may transmit an acknowledgment (ACK) message that is either an explicit ACK or an implicit ACK to confirm whether an indication of the unified TCI framework was successfully received (e.g., in the DCI). For example, to explicitly acknowledge receipt of the TCI framework, the UE may transmit an explicit ACK message such as one or more positive ACK bits, a dedicated ACK bit, or enhanced ACK information for the scheduled downlink channel. In some examples, the UE may transmit an implicit ACK. For example, the implicit acknowledgement may be a transmission of hybrid automatic repeat request (HARD) feedback for the downlink channel indicated in the same DCI as the beam indication. Based on transmitting the ACK, the UE may apply the received TCI framework.

A method for wireless communications at a user equipment (UE) is described. The method may include receiving, from a base station, downlink control information (DCI) scheduling a downlink shared channel, the DCI including a transmission configuration indicator (TCI) state indicating a common beam for at least one channel, transmitting, to the base station, a feedback message for the downlink shared channel, where the feedback message acknowledges receipt of the TCI state, and applying the TCI state after transmitting the feedback message acknowledging the receipt of the TCI state.

An apparatus for wireless communications at a UE is described. The apparatus may include a processor, memory in electronic communication with the processor, and instructions stored in the memory. The instructions may be executable by the processor to cause the apparatus to receive, from a base station, DCI scheduling a downlink shared channel, the DCI including a TCI state indicating a common beam for at least one channel, transmit, to the base station, a feedback message for the downlink shared channel, where the feedback message acknowledges receipt of the TCI state, and apply the TCI state after transmitting the feedback message acknowledging the receipt of the TCI state.

Another apparatus for wireless communications at a UE is described. The apparatus may include means for receiving, from a base station, DCI scheduling a downlink shared channel, the DCI including a TCI state indicating a common beam for at least one channel, means for transmitting, to the base station, a feedback message for the downlink shared channel, where the feedback message acknowledges receipt of the TCI state, and means for applying the TCI state after transmitting the feedback message acknowledging the receipt of the TCI state.

A non-transitory computer-readable medium storing code for wireless communications at a UE is described. The code may include instructions executable by a processor to receive, from a base station, DCI scheduling a downlink shared channel, the DCI including a TCI state indicating a common beam for at least one channel, transmit, to the base station, a feedback message for the downlink shared channel, where the feedback message acknowledges receipt of the TCI state, and apply the TCI state after transmitting the feedback message acknowledging the receipt of the TCI state.

Some examples of the method, apparatuses, and non-transitory computer-readable medium described herein may further include operations, features, means, or instructions for determining that a payload of the downlink shared channel includes a single transport block and transmitting, to the base station, a single positive ACK bit for the downlink shared channel to acknowledge the receipt of the TCI state based on the determining.

Some examples of the method, apparatuses, and non-transitory computer-readable medium described herein may further include operations, features, means, or instructions for determining that a payload of the downlink shared channel includes more than one transport block and trans-mitting, to the base station, at least one positive ACK bit for the downlink shared channel to acknowledge the receipt of the TCI state based on the determining.

Some examples of the method, apparatuses, and non-transitory computer-readable medium described herein may further include operations, features, means, or instructions for determining that the downlink shared channel may be configured with one or more code block groups and trans-mitting, to the base station, at least one positive ACK bit for the downlink shared channel to acknowledge the receipt of the TCI state based on the determining.

Some examples of the method, apparatuses, and non-transitory computer-readable medium described herein may further include operations, features, means, or instructions for generating the feedback message as an enhanced ACK message, the enhanced ACK message including a set of positive ACK bits and transmitting, to the base station, the enhanced ACK message to acknowledge the receipt of the TCI state based on the generating.

In some examples of the method, apparatuses, and non-transitory computer-readable medium described herein, the enhanced ACK message may be associated with a hybrid automatic repeat request (HARQ) type II codebook.

Some examples of the method, apparatuses, and non-transitory computer-readable medium described herein may further include operations, features, means, or instructions for receiving, from the base station via a radio resource control message, an indication that the feedback message for the downlink shared channel includes a set of ACK bits and an additional set of padded bits to acknowledge the receipt of the TCI state.

In some examples of the method, apparatuses, and non-transitory computer-readable medium described herein, transmitting the feedback message may include operations, features, means, or instructions for allocating the additional set of padded bits to a portion of a codebook for the downlink shared channel, the additional set of padded bits indicating a positive ACK value and transmitting, to the base station, at least the additional set of padded bits allocated to the portion of the codebook to acknowledge the receipt of the TCI state.

In some examples of the method, apparatuses, and non-transitory computer-readable medium described herein, a payload of the downlink shared channel includes more than one transport block and the method, apparatuses, and non-transitory computer-readable medium may include further operations, features, means, or instructions for transmitting, to the base station, a first positive ACK bit for a first transport block, the first positive ACK bit indicating the receipt of the downlink shared channel and transmitting, to the base station, a second positive ACK bit for a second transport block, the second positive ACK bit indicating the receipt of both the downlink shared channel and the DCI.

Some examples of the method, apparatuses, and non-transitory computer-readable medium described herein may further include operations, features, means, or instructions for generating a single positive ACK bit dedicated for the DCI in accordance with an HARQ type I codebook and transmitting, to the base station, the feedback message including the single positive ACK bit to acknowledge the receipt of the TCI state based on the generating.

Some examples of the method, apparatuses, and non-transitory computer-readable medium described herein may further include operations, features, means, or instructions for transmitting the feedback message to the base station using a set of uplink control channel resources associated with the downlink shared channel, where the feedback message includes a first acknowledgement of the downlink shared channel and a second acknowledgement of the receipt of the TCI state and applying the TCI state after transmitting the feedback message, where the feedback message indicates the receipt of the TCI state.

In some examples of the method, apparatuses, and non-transitory computer-readable medium described herein, the set of uplink control channel resources may be configured with a set of HARQ bits for transmitting the feedback message associated with the downlink shared channel.

In some examples of the method, apparatuses, and non-transitory computer-readable medium described herein, the set of uplink control channel resources may be indicated by the DCI.

In some examples of the method, apparatuses, and non-transitory computer-readable medium described herein, transmitting the feedback message may include operations, features, means, or instructions for determining that the TCI state indicating the common beam may be included in the DCI, identifying a set of uplink control channel resources in the DCI for transmitting the feedback message based on the DCI including the TCI state, and transmitting the feedback message to the base station using the set of uplink control channel resources to acknowledge the receipt of the TCI state.

Some examples of the method, apparatuses, and non-transitory computer-readable medium described herein may further include operations, features, means, or instructions for determining that the TCI state indicating the common beam may be included in the DCI and the at least one other DCI and transmitting the feedback message to the base station using the set of uplink control channel resources to acknowledge the receipt of the TCI state, or using a separate set of uplink control channel resources to acknowledge the receipt of the at least one other DCI.

In some examples of the method, apparatuses, and non-transitory computer-readable medium described herein, the TCI state indicating the common beam may be included in the DCI based on the DCI being received after the at least one other DCI.

In some examples of the method, apparatuses, and non-transitory computer-readable medium described herein, the TCI state indicates a joint indication or separate indications for the at least one channel.

In some examples of the method, apparatuses, and non-transitory computer-readable medium described herein, the TCI state indicating the common beam includes a layer-1 based beam indication.

A method for wireless communications at a base station is described. The method may include transmitting, to a UE, DCI scheduling a downlink shared channel, the DCI including a TCI state indicating a common beam for at least one channel and receiving, from the UE, a feedback message for the downlink shared channel, where the feedback message acknowledges receipt of the TCI state by the UE.

An apparatus for wireless communications at a base station is described. The apparatus may include a processor, memory in electronic communication with the processor, and instructions stored in the memory. The instructions may be executable by the processor to cause the apparatus to transmit, to a UE, DCI scheduling a downlink shared channel, the DCI including a TCI state indicating a common beam for at least one channel and receive, from the UE, a feedback message for the downlink shared channel, where the feedback message acknowledges receipt of the TCI state by the UE.

Another apparatus for wireless communications at a base station is described. The apparatus may include means for transmitting, to a UE, DCI scheduling a downlink shared channel, the DCI including a TCI state indicating a common beam for at least one channel and means for receiving, from the UE, a feedback message for the downlink shared channel, where the feedback message acknowledges receipt of the TCI state by the UE.

A non-transitory computer-readable medium storing code for wireless communications at a base station is described. The code may include instructions executable by a processor to transmit, to a UE, DCI scheduling a downlink shared channel, the DCI including a TCI state indicating a common beam for at least one channel and receive, from the UE, a feedback message for the downlink shared channel, where the feedback message acknowledges receipt of the TCI state by the UE.

Some examples of the method, apparatuses, and non-transitory computer-readable medium described herein may further include operations, features, means, or instructions for transmitting the downlink shared channel in a single transport block and receiving, from the UE, a single positive ACK bit for the downlink shared channel acknowledging the receipt of the TCI state based on the transmitting.

Some examples of the method, apparatuses, and non-transitory computer-readable medium described herein may further include operations, features, means, or instructions for transmitting the downlink shared channel in more than one transport block and receiving, by the UE, at least one positive ACK bit for the downlink shared channel acknowledging the receipt of the TCI state based on the transmitting.

Some examples of the method, apparatuses, and non-transitory computer-readable medium described herein may further include operations, features, means, or instructions for transmitting the downlink shared channel in one or more code block groups and receiving, from the UE, at least one positive ACK bit for the downlink shared channel acknowledging the receipt of the TCI state based on the transmitting.

Some examples of the method, apparatuses, and non-transitory computer-readable medium described herein may further include operations, features, means, or instructions for receiving, from the UE, the feedback message as an enhanced ACK message including a set of positive ACK bits, where the enhanced ACK message acknowledges the receipt of the TCI state.

In some examples of the method, apparatuses, and non-transitory computer-readable medium described herein, the enhanced ACK message may be associated with an HARQ type II codebook.

Some examples of the method, apparatuses, and non-transitory computer-readable medium described herein may further include operations, features, means, or instructions for transmitting, to UE via a radio resource control message, an indication that the feedback message for the downlink shared channel includes a set of ACK bits and an additional set of padded bits to acknowledge the receipt of the TCI state.

In some examples of the method, apparatuses, and non-transitory computer-readable medium described herein, receiving the feedback message may include operations, features, means, or instructions for receiving, from the UE, the additional set of padded bits in a portion of a codebook for the downlink shared channel, the additional set of padded bits indicating a positive ACK value acknowledging the receipt of the TCI state.

In some examples of the method, apparatuses, and non-transitory computer-readable medium described herein, a payload of the downlink shared channel includes more than one transport block and the method, apparatuses, and non-transitory computer-readable medium may include further operations, features, means, or instructions for receiving, from the UE, a first positive ACK bit for a first transport block, the first positive ACK bit indicating the receipt of the downlink shared channel and receiving, from the UE, a second positive ACK bit for a second transport block, the second positive ACK bit indicating the receipt of both the downlink shared channel and the DCI.

Some examples of the method, apparatuses, and non-transitory computer-readable medium described herein may further include operations, features, means, or instructions for receiving, from the UE, the feedback message including a single positive ACK bit dedicated for the DCI in accordance with an HARQ type I codebook, where the single positive ACK bit acknowledges receipt of the TCI state.

Some examples of the method, apparatuses, and non-transitory computer-readable medium described herein may further include operations, features, means, or instructions for receiving the feedback message from the UE on a set of uplink control channel resources associated with the downlink shared channel, where the feedback message includes a first acknowledgement of the downlink shared channel and a second acknowledgement of the receipt of the TCI state.

In some examples of the method, apparatuses, and non-transitory computer-readable medium described herein, the set of uplink control channel resources may be configured with a set of HARQ bits for transmitting the feedback message associated with the downlink shared channel.

In some examples of the method, apparatuses, and non-transitory computer-readable medium described herein, the set of uplink control channel resources may be indicated by the DCI.

In some examples of the method, apparatuses, and non-transitory computer-readable medium described herein, receiving the feedback message may include operations, features, means, or instructions for transmitting, in the DCI, the TCI state indicating the common beam and an indication of a set of uplink control channel resources for the feedback message based on the DCI including the TCI state and receiving the feedback message from the UE to acknowledge the receipt of the TCI state on the set of uplink control channel resources.

Some examples of the method, apparatuses, and non-transitory computer-readable medium described herein may further include operations, features, means, or instructions for transmitting the TCI state indicating the common beam in the DCI and the at least one other DCI and receiving the feedback message from the UE on the set of uplink control channel resources to acknowledge the receipt of the TCI state, or on a separate set of uplink control channel resources to acknowledge the receipt of the at least one other DCI.

In some examples of the method, apparatuses, and non-transitory computer-readable medium described herein, the TCI state indicating the common beam may be included in the DCI based on the DCI being transmitted after the at least one other DCI.

In some examples of the method, apparatuses, and non-transitory computer-readable medium described herein, the TCI state indicates a joint indication or separate indications for the at least one channel.

In some examples of the method, apparatuses, and non-transitory computer-readable medium described herein, the TCI state indicating the common beam includes a layer-1 based beam indication.

BRIEF DESCRIPTION OF THE DRAWINGS

FIG. 2 illustrates an example of a wireless communications network that supports downlink control information based unified transmission configuration indicator acknowledgement in accordance with aspects of the present disclosure.

FIGS. 8 and 9 show block diagrams of devices that support downlink control information based unified transmission configuration indicator acknowledgement in accordance with aspects of the present disclosure.

FIGS. 16 through 22 show flowcharts illustrating methods that support downlink control information based unified transmission configuration indicator acknowledgement in accordance with aspects of the present disclosure.

DETAILED DESCRIPTION

Figure 1:
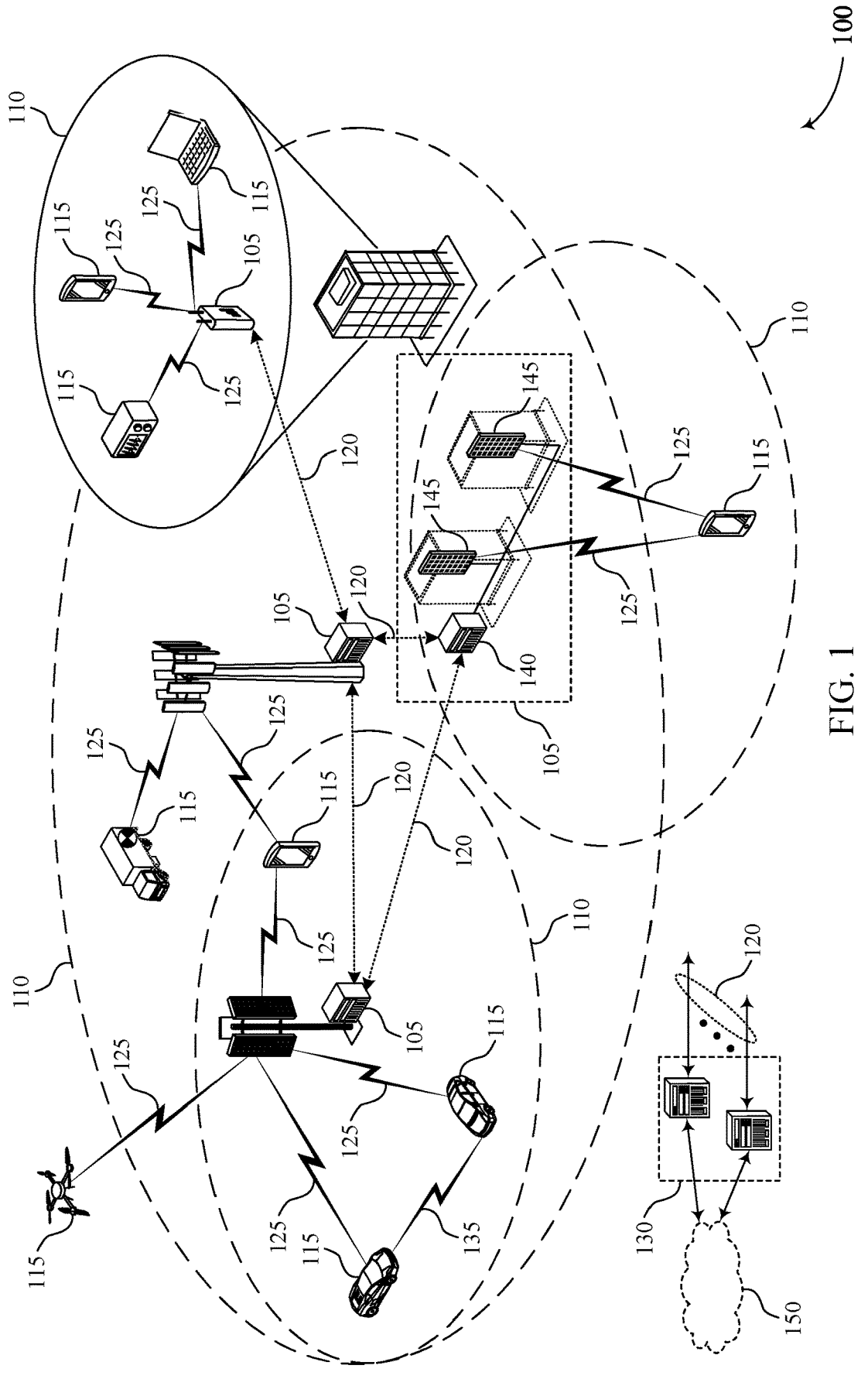
FIG. 1 illustrates an example of a wireless communications system that supports downlink control information based unified transmission configuration indicator acknowledgement in accordance with aspects of the present disclosure.

Some wireless communications networks may employ a unified transmission configuration indicator (TCI) framework to support beamformed communications between devices in the network. In accordance with the unified TCI framework, a joint common TCI state may indicate a common beam for at least one downlink channel (or downlink reference signal transmission) and at least one uplink channel (or uplink reference signal transmission), a downlink common TCI state may indicate a common beam used for at least two downlink channels, or an uplink common TCI state may indicate a common beam used for at least two uplink channels. In some examples, a base station may transmit downlink control information (DCI) to a user equipment (UE) to indicate the unified TCI framework. In some cases, an acknowledgement (ACK) message for a downlink channel scheduled by the DCI carrying the unified TCI framework indication can be used as an ACK also for the DCI to indicate successful reception of the unified TCI framework indication.

Associating the ACK for the DCI with the ACK for the scheduled downlink channel, however, may result in some issues. For example, the UE may decode the DCI successfully but may fail to decode the scheduled downlink channel, or the UE may partially decode the scheduled downlink channel. In such examples, the UE may transmit an ACK message, but the ACK message may not accurately convey whether the DCI is successfully received.

Various aspects generally relate to using a unified TCI framework for communications between two devices, and more specifically, to transmitting explicit and implicit ACK to confirm whether an indication of the unified TCI framework was successfully received (e.g., in the DCI) before using the unified TCI framework. Upon receiving an indication of a unified TCI framework (e.g., a beam indication) in a DCI from a base station in which the DCI also corresponds to at least one uplink transmission, a UE may apply the unified TCI framework for communications with the base station after ACK of the unified TCI framework. In some examples, the ACK of the unified TCI framework may include transmitting an explicit ACK message such as one or more positive ACK bits, a dedicated ACK bit, or enhanced ACK information for the scheduled downlink channel to explicitly indicate that at least the beam indication of the unified TCI framework was received correctly by the UE.

In some other examples, the ACK may be an implicit ACK. For example, the implicit indication for receipt of the DCI may include transmitting hybrid automatic repeat request (HARD) feedback for the downlink channel indicated in the same DCI as the beam indication. In some examples, the UE may receive multiple DCI, and the UE may transmit an implicit indication of the receipt of a DCI by transmitting feedback for the downlink channel indicated in the same DCI as the beam indication.

Aspects of the subject matter described in this disclosure may be implemented to realize one or more of the following potential advantages. The techniques employed by the described communication devices may provide benefits and enhancements to the operation of the communication devices, including increased reliability for using a common beam (e.g., a unified TCI state) for communications between the communication devices. For example, operations performed by the described communication devices may provide improvements to acknowledging a joint downlink/uplink beam indication or a separate downlink/uplink beam indication (e.g., a unified TCI framework. In some implementations, the operations performed by the described communication devices to acknowledge the indication may include transmitting an uplink transmission or a feedback message indicated by a same control message (e.g., a DCI message) that includes the joint downlink/uplink beam indication or the separate downlink/uplink beam indication. By explicitly or implicitly acknowledging the indication by transmitting an uplink message, the communication devices may more efficiently acknowledge the indication for the control message that carries the joint downlink/uplink beam indication, thus decreasing latency and improving communication reliability, among other benefits.

Aspects of the disclosure are initially described in the context of wireless communications systems. Aspects of the disclosure are further illustrated by and described with reference to apparatus diagrams, system diagrams, process flows, and flowcharts that relate to DCI based unified TCI acknowledgement.

FIG. 1 illustrates an example of a wireless communications system 100 that supports DCI based unified TCI acknowledgement in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some wireless communications systems, two devices may use different TCI states for communications between each other, for example, for beamformed transmissions between the two devices in the system. In some examples, the two devices may use a unified TCI framework for the communications. The unified TCI framework may include a joint common TCI state for uplink and downlink communications, a separate uplink common TCI state, a separate downlink common TCI state, or a combination thereof. For example, the joint common TCI state for uplink and downlink communications may indicate a common beam for at least one downlink channel (or downlink reference signal) plus at least one uplink channel (or uplink reference signal), the separate downlink common TCI state may indicate a common beam for at least two downlink channels (or downlink reference signals), and the separate uplink common TCI state may indicate a common beam for at least two uplink channels (or uplink reference signals). For the unified TCI framework, a UE 115 may support a joint TCI for downlink and uplink communications based on a downlink TCI framework. In some implementations, the term "TCI" may include a TCI state that includes at least one source reference signal to provide a reference (e.g., for UE assumption) for a device to determine a quasi-colocation (QCL), a spatial filter, or both, for communications with an additional device.

To accommodate the case of separate beam indications for uplink and downlink communications in accordance with the unified TCI framework, a UE 115 may utilize two separate TCI states (e.g., one TCI state for the downlink communications and one TCI state for the uplink communications). For the separate downlink common TCI state, source reference signal(s) in M TCIs may provide QCL information at least for UE-dedicated reception on a downlink shared channel (e.g., a physical downlink shared channel (PDSCH)) and for UE-dedicated reception on all or a subset of CORESETs in a component carrier. For the separate uplink common TCI state, source reference signal(s) in N TCIs may provide a reference for determining one or more common uplink transmission spatial filters at least for a dynamic-grant or configured-grant based uplink shared channel (e.g., a physical uplink shared channel (PUSCH)) or for all or a subset of dedicated uplink control channel resources (e.g., physical uplink control channel (PUCCH) resources) in a component carrier. In some cases, this uplink transmission spatial filter may also apply to all sounding reference signal (SRS) resources in one or more resource sets configured for antenna switching, codebook-based uplink transmissions, non-codebook-based uplink transmissions, or a combination thereof.

For the unified TCI framework (e.g., common beam TCI state), a UE 115 may be indicated either explicitly or implicitly at least one set of multiple applicable channel(s) (or reference signal(s)) to which each type of TCI state can be applied. Additionally, TCI states may include the following types. A first TCI type may include the joint common TCI state for uplink and downlink communications (e.g., a joint DL/UL common TCI state) as described herein (e.g., to indicate a common beam for at least one downlink channel or downlink reference signal plus at least one uplink channel or uplink reference signal). A second TCI type may include the separate downlink common TCI state as described herein (e.g., to indicate a common beam for at least two downlink channels or downlink reference signals). A third TCI type may include the separate uplink common TCI state as described herein (e.g., to indicate a common beam for at least two uplink channels or uplink reference signals). A fourth TCI type may include a separate downlink single channel or downlink reference signal TCI state to indicate a beam for a single downlink channel or downlink reference signal. A fifth TCI type may include a separate uplink single channel or uplink reference signal RS TCI state to indicate a beam for a single uplink channel or uplink reference signal.

In some cases, an association may exist between channel(s), reference signal(s), or both and a common beam TCI (e.g., a unified TCI framework). The channel(s) and reference signals(s) applicable to each TCI type may include the following candidates: UE specific or non-UE specific physical downlink control channel (PDCCH), PDSCH, PUCCH, PUSCH; synchronization signal/physical broadcast channel block (SSB), periodic channel status information (CSI) reference signal (RS), semi-periodic CSI-RS, aperiodic CSI-RS, periodic positioning reference signal (PRS), semi-periodic PRS, aperiodic PRS; periodic SRS, semi-periodic SRS, aperiodic SRS; or any combination thereof.

The PDSCH, PUCCH, and PUSCH may be dynamically scheduled (e.g., by DCI), semi-statically activated (e.g., by DCI or a MAC control element (CE)), or semi-statically configured (e.g., by RRC). The PDSCH may enable a scheduling offset between a DCI and the PDSCH that is equal to or greater than a beam switch latency threshold or a scheduling offset that is less than the beam switch latency threshold. Additionally, the PDCCH may be carried by all or a subset of CORESETs. The purpose of the CSI-RSs may be for CSI measurements and a CSI report (when higher layer parameters are not indicated, such as tracking reference signal (TRS) information or a repetition parameter), for a beam measurement and report (when a higher layer parameter for repetition is included), for TRS measurement (when a higher layer parameter for TRS information is included), or for a combination thereof. The purpose of the SRS may be for antenna switching, beam management, codebook based PUSCH, and non-codebook based PUSCH. In some cases, the PUCCH, SSB, CSI-RS, PRS, SRS, or a combination thereof may be all or a subset of corresponding configured resources.

In some cases, a base station 105 may use a DCI-based beam indication framework to indicate one or more TCI states for a UE 115 to use. For example, in one beam indication signaling medium to support joint or separate downlink or uplink beam indications for the unified TCI framework, the base station 105 and the UE 115 may support a Layer 1 (L1)-based beam indication using at least UE-specific (e.g., unicast) DCI to indicate joint or separate downlink or uplink beam indications from active TCI states for the UE 115. In some examples, DCI formats 1_1 and 1_2 may be used for this beam indication. Additionally, the UE 115 may support a mechanism to acknowledge successful decoding of beam indication. For example, an acknowledgment feedback (e.g., a positive ACK or a negative ACK (NACK)) of a PDSCH scheduled by the DCI carrying the beam indication may be used as an acknowledgment feedback also for the DCI.

Additionally, or alternatively, a base station 105 and a UE 115 may support a DCI-based carrier aggregation beam indication. For example, for the unified TCI framework, the base station 105 and the UE 115 may support a common TCI state identifier (ID) update and activation to provide common QCL information, common uplink transmissions spatial filter(s) across a set of configured component carriers, or both. This common TCI state ID update and activation may apply to intra-band carrier aggregation, to an inter-band carrier aggregation, to a joint downlink/uplink beam indication, to separate downlink and uplink beam indications, or a combination thereof. Additionally, the common TCI state ID may indicate that a same or single reference signal determined according to the TCI state(s) indicated by a common TCI state ID may be used to provide a QCL indication (e.g., a QCL Type-D indication) and to determine an uplink transmission spatial filter across a set of configured component carriers.

In some cases, a base station 105 and a UE 115 may use a timeline for a DCI-based beam indication framework to determine when to start using the beam framework (e.g., TCI states or beams) indicated by the DCI. For example, if a beam indication is received in a DCI, the UE 115 may begin using one or more beams indicated by the beam indication in a first slot (or different length TTI) that is at least X ms or Y symbols after the DCI with the beam indication is received (e.g., a joint downlink/uplink beam indication or separate downlink/uplink beam indications). Alternatively, if a beam indication is received in a DCI, the UE 115 may begin using one or more beams indicated by the beam indication in a first slot that is at least X ms or Y symbols after an acknowledgment of the joint or separate downlink/uplink beam indication is transmitted by the UE

115. Existing timing defined for DCI-based TCI or spatial relation updates may be used for X and Y, or new timing may be defined for X and Y. Additionally, the UE 115 and the base station 105 may apply this delay (e.g., a minimum indication delay) in some situations but not in other situations. For example, the UE 115 and the base station 105 may use the delay when a newly indicated beam is different than a previously indicated beam.

In addition, the UE 115 may utilize a number of padded NACK bits for the transmission of feedback information. If the UE 115 is provided a PDSCH parameter (e.g., PDSCH-CodeBlockGroupTransmission) for a serving cell, the UE 115 may receive a corresponding PDSCH scheduled by DCI format 1_1 that includes code block groups (CBGs) of a transport block. The UE 115 may also be provided a parameter configuring the number of available code blocks (e.g., maxCodeBlockGroupsPerTransportBlock) indicating a maximum number (e.g., $$N_{HARQ-ACK}^{CBG/TBmax})$$

of CBGs for generating respective HARQ-ACK information bits for a transport block reception for the serving cell.

The UE 115 may generate an ACK for the HARQ-ACK information bit of a CBG if the UE 115 correctly receives all code blocks of the CBG, and conversely, the UE 115 may generate a NACK for the HARQ-ACK information bit of a CBG if the UE incorrectly received at least one code block of the CBG. In some examples, the UE 115 may receive two transport blocks and may concatenate the HARQ-ACK information bits for CBGs of the second transport block after the HARQ-ACK information bits for CBGs of the first transport block. The HARQ-ACK codebook associated with the PDSCH may include a total number of HARQ-ACK information bits (e.g., $$N_{HARQ-ACK}^{CBG/TBmax}$$

HARQ-ACK information bits) and, if the number of code block groups actually received by the UE 115 is less than the total (e.g., $$N_{HARQ-ACK}^{CBG/TB} < N_{HARQ-ACK}^{CBG/TBmax})$$

for a transport block, the UE 115 may generate a NACK value for the number of incorrectly received HARQ-ACK information bits $$(N_{HARQ-ACK}^{CBG/TBmax} - N_{HARQ-ACK}^{CBG/TB}$$

bits) for the transport block in the HARQ-ACK codebook. In some cases, the UE 115 may transmit such feedback for indicating the successful or unsuccessful receipt of the DCI-based TCI indication.

In some cases, however, the acknowledgment of the joint or separate downlink/uplink beam indication (e.g., from the TCI in the DCI) may not be clear due to the following issues. In some examples, the UE 115 may decode the DCI successfully but decoding the PDSCH may fail, such that a NACK bit transmitted for the PDSCH does not mean that the UE 115 has failed to decode the DCI. Additionally, or alternatively, the UE 115 may decode some part of the PDSCH while losing other part(s) of the PDSCH (e.g., when the PDSCH has multiple transport blocks (TBs) or code-block groups (CBGs)). In other examples, the UE 115 may transmit an ACK for the PDSCH, but the base station 105 may fail to decode uplink control information carrying the ACK (e.g., a PUCCH failure or a last DCI mis-detection). Additionally, or alternatively, the UE 115 may be scheduled with other uplink transmissions (e.g., SRSs or PUSCHs). In these different situations, the UE 115 may transmit an acknowledgment message that does not accurately convey whether the DCI carrying the beam indication is successfully received or not.

The wireless communications system 100 may support techniques for a UE 115 to implicitly or explicitly acknowledge that a beam indication (or indication of one or more TCI states) was received (e.g., in a DCI message) and then may use one or more beams indicated by the beam indication, in addition to a scheduling for receiving a downlink channel, along with other information. In some examples, a base station 105 may transmit a DCI message to the UE 115 that includes a first indication of one or more TCI states for the UE 115 to use for communications with the base station 105.

In some cases, the UE 115 may transmit an ACK message for the downlink channel scheduled by the DCI carrying the unified TCI framework indication to indicate successful reception of the one or more TCI states. In some cases, however, the UE 115 may decode the DCI successfully but may fail in decoding the scheduled downlink channel, or the UE may partially decode the scheduled downlink channel.

To more accurately and reliably report the receipt of the one or more TCI indications, the UE 115 may transmit an explicit or implicit ACK to the base station 105 to confirm whether an indication of the unified TCI framework was successfully received. In some examples, the ACK of the unified TCI framework may include transmitting an explicit ACK message such as one or more ACK bits, a dedicated ACK bit, or enhanced ACK information for the scheduled downlink channel. In some other examples, the ACK may be an implicit ACK. For example, the implicit ACK may include transmitting ACK/NACK feedback for the downlink channel indicated in the same DCI as the beam indication. In some examples, the UE may receive multiple DCI, and the UE may transmit an implicit indication of the receipt of a DCI by transmitting feedback for the PDSCH indicated in the same DCI as the beam indication.

FIG. 2 illustrates an example of a wireless communications network 200 that supports DCI based unified TCI acknowledgement in accordance with aspects of the present disclosure. The wireless communications system 200 may implement aspects of wireless communications system 100. For example, the wireless communications system 200 may include a base station 105-*a* and a UE 115-*a*, which may represent examples of base stations 105 and UEs 115, respectively, as described with reference to FIG. 1. Additionally, the base station 105-*a* and the UE 115-*a* may support beamformed transmissions (e.g., beams used for the beamformed transmissions may correspond to different TCI states).

To support multi-beam based operation for transmissions of DCI, wireless communications system 200 may support a higher-layer configuration indicating one or more TCI states per control resource set (CORESET). A UE 115-*a* may monitor a specific search space set associated with a CORE- SET, and the UE 115-*a* may receive DCI (DCI) 205 on a physical downlink control channel (PDCCH) in the CORE-SET based on a TCI state configured for the CORESET. In some examples, the DCI 205 may indicate a scheduling of a physical downlink shared channel (PDSCH) 210 for conveying downlink data to the UE 115-*a*. In some examples, the DCI 205 may contain a TCI state that the UE 115-*a* may use for communications with the base station 105-*b* or other devices in the wireless network.

In some examples, the UE 115-*a* may use the TCI state indicated in DCI 205 to determine beam information by means of a quasi-co-location (QCL) relationship between downlink reference signals (e.g., channel state information RS (CSI-RS) associated with a beam) and the demodulation reference signal (DMRS) of the PDCCH. In some cases, the UE 115-*a* may be configured with a number of TCI states for a CORESET. Each TCI state contains parameters for reference signal resources and the QCL relationship between the reference signals and the DMRS ports of the PDCCH. For example, a TCI state may include at least one source reference signal to provide a reference (e.g., a UE assumption) for determining the QCL assumption or spatial filter information. To receive the DCI 205, the UE 115-*a* monitors the PDCCH in monitoring occasions of search space sets using the receiver beam configured by a previously applied TCI state activated for the UE 115-*a*, or by using a beam used during an initial access procedure.

In some cases, the wireless communications network 200 may support a unified TCI framework described with reference to FIG. 1, where the UE 115-*a* may receive an indication of one or more communications channels or reference signals supporting different types of TCI states, such as a unified TCI state indicating a common (e.g., shared) beam for at least one downlink channel or reference signal in addition to at least one uplink channel or reference signal.

As shown in the example of FIG. 2, the base station 105-*a* may transmit a DCI 205 that includes both an indication of one or more TCI states 220 (e.g., a beam indication, a unified TCI framework indication, a joint downlink/uplink beam indication, a separate downlink/uplink beam indication) for the UE 115-*a* to use for communicating with the base station 105-*a*. The DCI 205 may both indicate which TCI states 220 for the UE 115-*a* to use and may correspond to one or more uplink transmissions for the UE 115-*a* to transmit. For example, the uplink transmissions may be one or more PUCCH transmissions, one or more SRS transmissions, one or more CSI reports, ACK/NACK feedback for the PDSCH, a confirmation message transmission for a configured grant activation indication, a configured grant PUSCH transmissions, or a combination thereof.

In some examples, the wireless communications system 200 may support various explicit or implicit acknowledgements for a unified TCI indication (or unified TCI framework indication). For example, for a beam indication (e.g., an L1-based beam indication) using at least a UE-specific (e.g., unicast) DCI (e.g., DCI 205) to indicate joint or separate downlink/uplink beam indication (e.g., the unified TCI indication or unified TCI framework indication) from active TCI states for the UE 115-*a*, the UE 115-*a* may apply the beam indication after transmitting an acknowledgment 215 of the joint or separate downlink/uplink beam indication. For example, the acknowledgment 215 may include transmitting one or more ACK bits for the PDSCH 210 to explicitly indicate that at least the DCI 205 was received correctly by the UE 115-*a*. In some other examples, the UE 115-*a* may indicate successful receipt of the DCI 205 by using a number of padded ACK bits configured for the PDSCH 210 to explicitly indicate that at least the DCI 205 was received correctly by the UE 115-*a*. In some examples, the UE 115-*a* may use a dedicated ACK bit (e.g., an ACK bit specific to acknowledging the DCI 205) associated with a HARQ type-1 codebook to explicitly indicate that at least the DCI 205 was received correctly by the UE 115-*a*.

In some other examples, the acknowledgement 215 may be an implicit acknowledgement. For example, the implicit indication for receipt of the DCI may include transmitting ACK/NACK feedback for the PDSCH indicated in the same DCI as the beam indication. In some examples, the UE 115-*a* may receive multiple DCI 205, and the UE 115-*a* may transmit an implicit indication of the receipt of a DCI 205 by transmitting feedback for the PDSCH indicated in the same DCI as the beam indication.

By providing an explicit or implicit acknowledgement 215 for a joint downlink/uplink beam indication or a separate downlink/uplink beam indication, the UE 115-*a* and base station 105-*a* may more efficiently capture whether the corresponding beam indication was successfully received or not. Accordingly, incorporating both explicit and implicit acknowledgment of receipt of the TCI state 220 as described herein may decrease latency and improve communication reliability, among other benefits.

Figure 3:
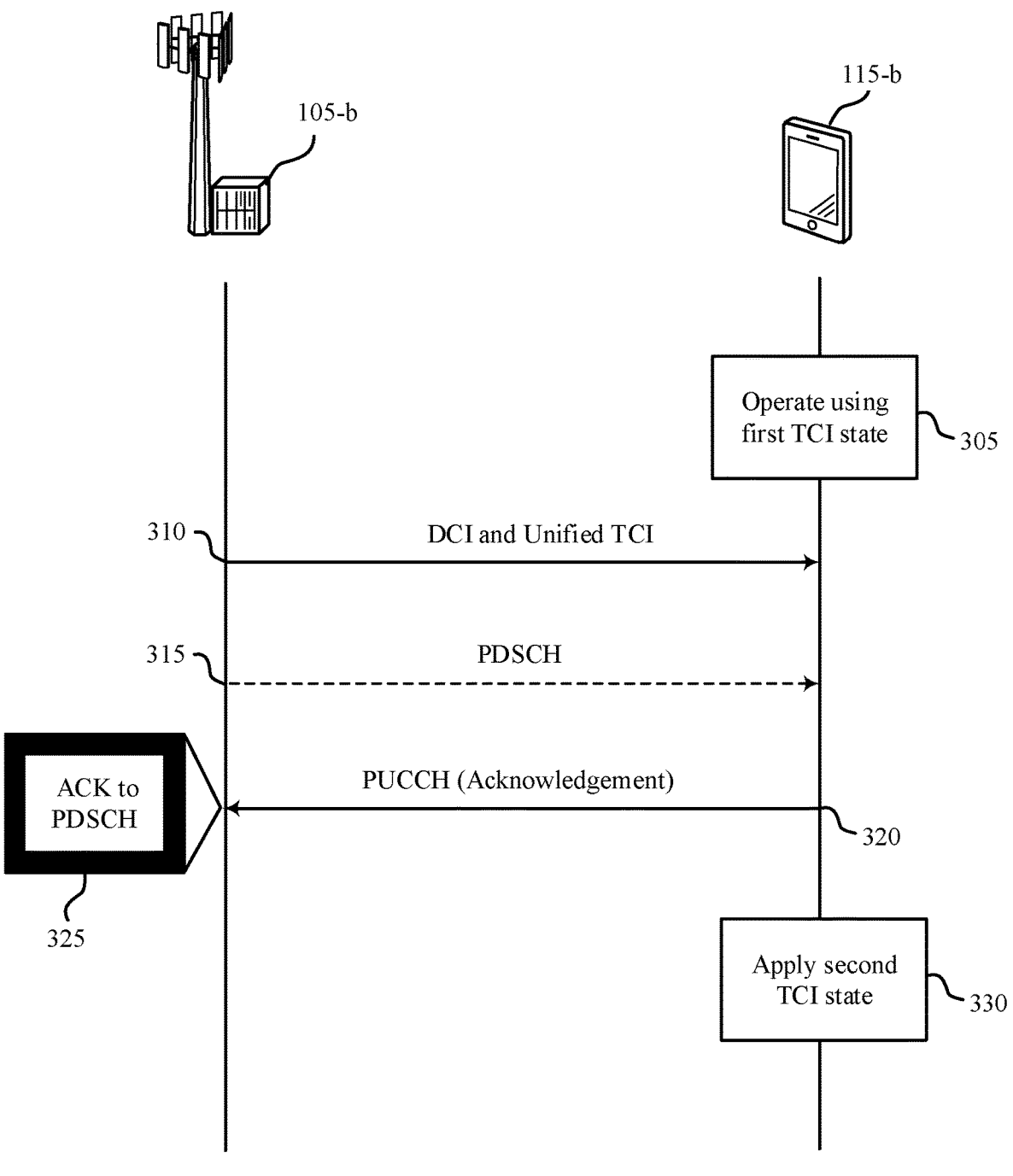
FIGS. 3 through 7 illustrate examples of timelines that support downlink control information based unified transmission configuration indicator acknowledgement in accordance with aspects of the present disclosure.

FIG. 3 illustrates an example of a process flow 300 that supports DCI based unified TCI acknowledgement in accordance with aspects of the present disclosure. Process flow 300 may implement aspects of FIGS. 1-2. For example, UE 115-*b* and a base station 105-*a* (which may be examples of a UE 115 and base station 105 described with reference to FIGS. 1-2) may implement processes of the process flow 300 to determine when the UE 115-*b* is to start using one or more TCI states (e.g., beams) indicated by the base station 105-*b* for communications with the base station 105-*b*. In some examples, the one or more TCI states may correspond to a unified TCI framework that indicates a common beam that can be used by the UE 115-*b* for at least one uplink channel (or uplink reference signal) and for at least one downlink channel (or downlink reference signal), a common beam that can be used by the UE 115-*b* for at least two downlink channels (or downlink reference signals), or a common beam that can be used by the UE 115-*b* for at least two uplink channels (or uplink reference signals). The UE 115-*b* may begin using the one or more TCI states after transmitting an acknowledgement of the DCI and one or more TCI states.

At 305, the UE 115-*b* may be operating in accordance with a first TCI state. For example, the UE 115-*b* may operate using a TCI state indicated via a first DCI received from the base station 105-*b* during a previous transmission time interval.

At 310, the base station 105-*b* may transmit a DCI to the UE 115-*b*, and the DCI may include a first indication of the one or more TCI states, such as an indication of a unified TCI state, for the UE 115-*b* to use for communications with the base station 105-*b*. In some examples, the DCI may further include an additional indication of a scheduled downlink channel transmission (e.g., a PDSCH) or one or more uplink channels scheduled for the UE 115 to transmit. In accordance with the indication received in the DCI, at 315 the UE 115-*b* may receive (or attempt to receive) a downlink transmission (e.g., a PDSCH) from the base station 105-*b* on a number of transmission blocks or code block groups configured for the downlink transmission.

In some cases, the UE 115-*b* may correctly receive both the DCI indicating the one or more TCI states and the PDSCH, or in some other cases the UE 115-*b* may correctly receive the DCI indicating the one or more TCI states while incorrectly receiving the PDSCH. In either case, the UE 115-*a* may transmit an acknowledgement at 320 (e.g., a positive ACK bit) to explicitly acknowledge receipt of the DCI including the one or more TCI states.

In a first case, the PDSCH may be transmitted in a single transport block (e.g., single TB PDSCH), and the UE 115-*b* may transmit a positive ACK bit 325 as a reception confirmation for the PDSCH scheduled by the DCI. In such cases, the single positive ACK bit 325 associated with the PDSCH may explicitly indicate at least the receipt of the DCI and the one or more TCI states indicated in the same DCI. In some examples, the single positive ACK bit 325 may be transmitted on a PUCCH scheduled by the DCI. In some other examples, the single positive ACK bit 325 may be multiplexed on a PUSCH. For example, a positive ACK bit 325 may be a positive acknowledgement (ACK) where the HARQ-ACK information bit value is 1.

In a second case, the PDSCH may be transmitted in multiple transport blocks (e.g., multi-TB PDSCH), and the UE 115-*b* may transmit at least one positive ACK bit 325 for the PDSCH scheduled by the DCI. The at least one positive ACK bit may be a reception confirmation to any of the multiple transport blocks scheduled by the DCI which also indicates the one or more TCI states. In such cases, the at least one positive ACK bit 325 associated with the PDSCH may explicitly indicate at least the receipt pf the DCI and the one or more TCI states. In some examples, the number of ACK bits 325 transmitted by the UE 115-*b* may depend on the number of transport blocks in which the PDSCH was transmitted. In some examples, the at least one positive ACK bit 325 may be transmitted on a PUCCH scheduled by the DCI. In some other examples, the single positive ACK bit 325 may be multiplexed on a PUSCH. For example, a positive ACK bit 325 may be a positive acknowledgement (ACK) where the HARQ-ACK information bit value is 1.

In a third case, the PDSCH may be configured with multiple CBGs (e.g., multi-CBG PDSCH), and the UE 115-*b* may transmit at least one positive ACK bit 325 for the PDSCH scheduled by the DCI. The at least one positive ACK bit may be a reception confirmation to any of the multiple CBGs scheduled by the DCI which also indicates the one or more TCI states. In such cases, the at least one positive ACK bit 325 associated with the PDSCH may explicitly indicate at least the receipt pf the DCI and the one or more TCI states. In some examples, the number of ACK bits 325 transmitted by the UE 115-*b* may depend on the number of CBGs configured for the PDSCH. In some examples, the at least one positive ACK bit 325 may be transmitted on a PUCCH scheduled by the DCI. In some other examples, the single positive ACK bit 325 may be multiplexed on a PUSCH. For example, a positive ACK bit 325 may be a positive acknowledgement (ACK) where the HARQ-ACK information bit value is 1.

In a fourth case, the UE 115-*b* may indicate the DCI detection status in enhanced ACK information associated with a type-2 HARQ codebook (e.g., enhanced-ACK PDSCH). In such cases, the enhanced ACK information may include an indication (via one or more fields or other portions of the ACK information) that explicitly acknowledges successful receipt of the DCI including the one or more TCI states. In some examples, the enhanced ACK information may be sent in accordance with the type-2 HARQ codebook associated with the PDSCH. In some examples, the enhanced ACK information may be transmitted on a PUCCH scheduled by the DCI. In some other examples, the enhanced ACK information may be multiplexed on a PUSCH.

Additionally, or alternatively, the UE 115-*b* may use a number of padded ACK bits to explicitly acknowledge successful receipt of the DCI including the one or more TCI states. For example, the UE 115-*b* may receive, via RRC signaling from the base station 105-*b*, a parameter (e.g., "ACK-padding-for TCI") which may enable the padded ACK bits associated with a HARQ codebook. In cases where the PDCCH is transmitted using one or more code block groups (e.g., padding ACK to CBG), the padded ACK bits may be associated with the PDSCH when the PDSCH is configured a number of $$N_{HARQ-ACK}^{CBG/TBmax}$$

HARQ-ACK information bits if $$N_{HARQ-ACK}^{CBG/TB} < N_{HARQ-ACK}^{CBG/TBmax}$$

for a transport block in the scheduled PDSCH. The UE 115-*b* may generate an ACK value for the last $$N_{HARQ-ACK}^{CBG/TBmax} - N_{HARQ-ACK}^{CBG/TBmax}$$

HARQ-ACK information bits for the transport block of the scheduled PDSCH in the HARQ-ACK codebook if the beam indication is received.

In some other cases, the UE 115-*b* may monitor a PDCCH monitoring occasion with DCI format 1_0 or DCI format 1_1 in an active downlink bandwidth part or other allocated resources of a serving cell, or an occasion for a candidate PDSCH reception may be in response to a PDCCH with a DCI format 1_1. In such cases, if a higher level parameter associated with spatial bundling of HARQ information bit (e.g., harq-ACK-SpatialBundlingPUCCH) is not provided and a maximum number of two code words is configured (e.g., configured by maxNrofCodeWordsScheduled-ByDCI=2), the UE 115-*b* may receive the PDSCH with one transport block, to explicitly indicate a receipt of the DCI and associated one or more TCI states, the HARQ-ACK information may be associated with the first transport block and the UE 115-*b* may generate an ACK value for the second transport block of the PDSCH to send to the base station 105-*b*.

At 330, the UE 115-*b* may apply the one or more TCI states (e.g., including at least a second TCI state different from the first TCI state) after transmitting the ACK to PDSCH acknowledgement 325 indicating the successful receipt of the DCI and the one or more TCI states.

Figure 4:
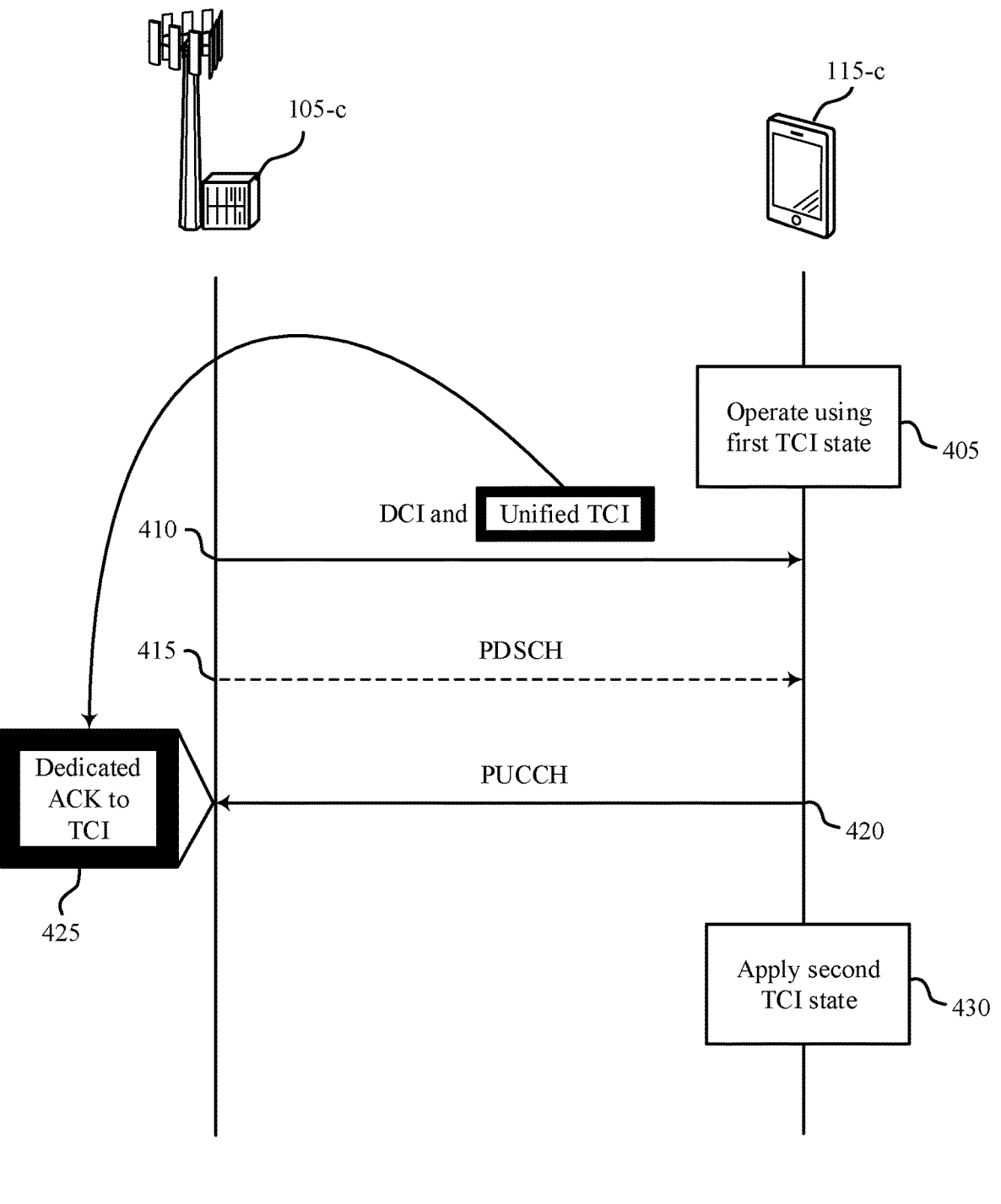

FIG. 4 illustrates an example of a process flow 400 that supports DCI based unified TCI acknowledgement in accordance with aspects of the present disclosure. Process flow 400 may implement aspects of FIGS. 1-3. For example, UE 115-*c* and a base station 105-*c* (which may be examples of a UE 115 and base station 105 described with reference to FIGS. 1-3) may implement processes of the process flow 300 to determine when the UE 115-*c* is to start using one or more TCI states (e.g., beams) indicated by the base station 105-*c* for communications with the base station 105-*c*. In some examples, the one or more TCI states may correspond to a unified TCI framework that indicates a common beam that can be used by the UE 115-c for at least one uplink channel (or uplink reference signal) and for at least one downlink channel (or downlink reference signal), a common beam that can be used by the UE 115-c for at least two downlink channels (or downlink reference signals), or a common beam that can be used by the UE 115-c for at least two uplink channels (or uplink reference signals). The UE 115-c may begin using the one or more TCI states after transmitting an acknowledgement of the DCI and one or more TCI states.

At 405, the UE 115-c may be operating in accordance with a first TCI state. For example, the UE 115-c may operate using a TCI state indicated via a first DCI received from the base station 105-c during a previous transmission time interval.

At 410, the base station 105-c may transmit a DCI to the UE 115-c, and the DCI may include a first indication of the one or more TCI states, such as an indication of a unified TCI state, for the UE 115-c to use for communications with the base station 105-c. In some examples, the DCI may further include an additional indication of a scheduled downlink channel transmission (e.g., a PDSCH) or one or more uplink channels scheduled for the UE 115-c to transmit. In accordance with the indication received in the DCI, at 415 the UE 115-c may receive (or attempt to receive) a downlink transmission (e.g., a PDSCH) from the base station 105-c on a number of transmission blocks or code block groups configured for the downlink transmission.

In some cases, the UE 115-c may correctly receive both the DCI indicating the one or more TCI states and the PDSCH, or, in some other cases, the UE 115-b may correctly receive the DCI indicating the one or more TCI states while incorrectly receiving the PDSCH. In either case, the UE 115-c may transmit an acknowledgement at 320 (e.g., a positive ACK bit) to explicitly acknowledge receipt of the DCI including the one or more TCI states.

At 420, the UE 115-c may transmit an acknowledgment 425 of the joint or separate downlink/uplink beam indication of the one or more TCI states received in the DCI. In some examples, the acknowledgement may be a dedicated ACK bit associated with the one or more TCI states (e.g., the ACK bit may specifically indicate successful reception of the one or more TCI states). The acknowledgement 425 may be transmitted in accordance with a type I HARQ codebook of the scheduled PDSCH. In some cases, the dedicated ACK bit is indicated in one or more DCI formats (e.g., DCI1_1 or DCI 1_2) for a scheduled PDSCH reception occasion to indicate the acknowledgement of the TCI indication in the DCI.

At 430, the UE 115-c may apply the one or more TCI states (e.g., including at least a second TCI state different from the first TCI state) after transmitting the ACK to TCI acknowledgement 425 indicating the successful receipt of the DCI and the one or more TCI states indicated in the same DCI.

Figure 5:
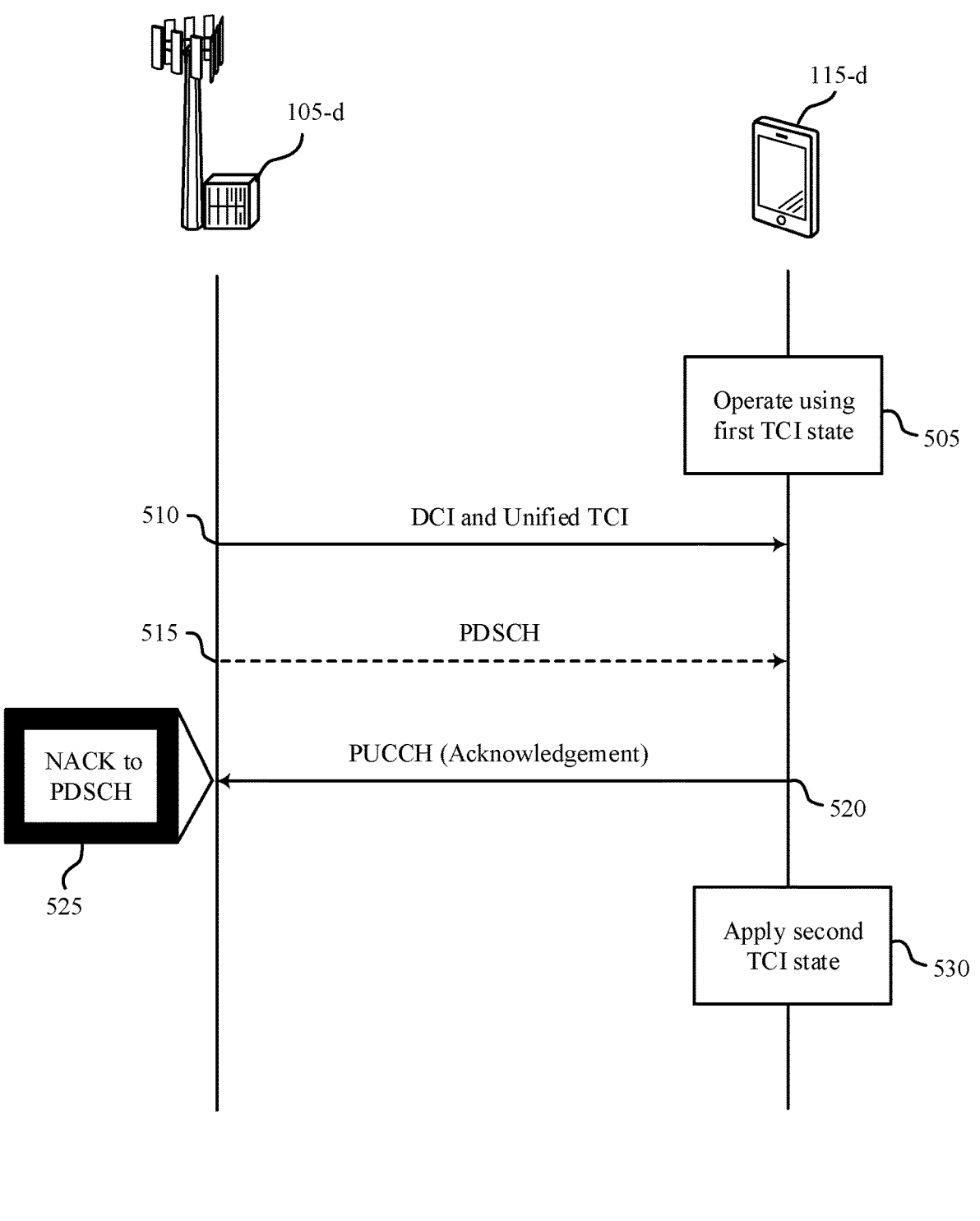

FIG. 5 illustrates an example of a process flow 500 that supports DCI based unified TCI acknowledgement in accordance with aspects of the present disclosure. Process flow 500 may implement aspects of FIGS. 1-4. For example, UE 115-d and a base station 105-d (which may be examples of a UE 115 and base station 105 described with reference to FIGS. 1-4) may implement processes of the process flow 500 to determine when the UE 115-d is to start using one or more TCI states (e.g., beams) indicated by the base station 105-d for communications with the base station 105-d. In some examples, the one or more TCI states may correspond to a unified TCI framework that indicates a common beam that can be used by the UE 115-d for at least one uplink channel (or uplink reference signal) and for at least one downlink channel (or downlink reference signal), a common beam that can be used by the UE 115-d for at least two downlink channels (or downlink reference signals), or a common beam that can be used by the UE 115-d for at least two uplink channels (or uplink reference signals). The UE 115-d may begin using the one or more TCI states after transmitting an acknowledgement of the DCI and one or more TCI states.

At 505, the UE 115-d may be operating in accordance with a first TCI state. For example, the UE 115-d may operate using a TCI state indicated via a first DCI received from the base station 105-d during a previous transmission time interval.

At 510, the base station 105-d may transmit a DCI to the UE 115-d, and the DCI may include a first indication of the one or more TCI states, such as an indication of a unified TCI state, for the UE 115-d to use for communications with the base station 105-d. In some examples, the DCI may further include an additional indication of a scheduled downlink channel transmission (e.g., a PDSCH) and a downlink assignment index associated with the downlink channel, or one or more uplink channels scheduled for the UE 115-d to transmit (e.g., PUCCH). In accordance with the indication received in the DCI, at 515 the UE 115-d may receive (or attempt to receive) a downlink transmission (e.g., a PDSCH) from the base station 105-d.

In some cases, the UE 115-d may correctly receive both the DCI indicating the one or more TCI states and the PDSCH, or, in some other cases, the UE 115-d may correctly receive the DCI indicating the one or more TCI states while incorrectly receiving the PDSCH. In either case, the UE 115-d may transmit an acknowledgement at 520 which may implicitly acknowledge receipt of the DCI including the one or more TCI states.

In some cases, the UE 115-d and the base station 105-d may use transmission of the PUCCH as an implicit acknowledgment for the successful receipt of the one or more TCI states. For example, the DCI may indicate resources for transmission of the PUCCH which carriers an HARQ codebook associated for feedback of the PDSCH. In some cases, the HARQ codebook carried the PUCCH transmission includes the ACK/NACK bits 525 associated with the scheduled PDSCH. In such examples, the base station 105-d may interpret any PUCCH transmission (e.g., regardless of ACK/NACK bits 525 is an ACK or NACK bit) for the PDSCH as an implicit acknowledgement of a successful receipt of the DCI.

Additionally or alternatively, resources for the PUCCH transmission may be indicated uniquely based on the DCI carrying the one or more TCI states, For example, if the base station 105-d receives the PUCCH on one or more resources indicated by the DCI, the base station 105-d may interpret the received PUCCH as an implicit acknowledgment for the successful receipt of the one or more TCI states.

At 530, the UE 115-d may apply the one or more TCI states (e.g., including at least a second TCI state different from the first TCI state) after transmitting the NACK to PDSCH 525 indicating the successful receipt of the DCI and the one or more TCI states.

Figure 6:
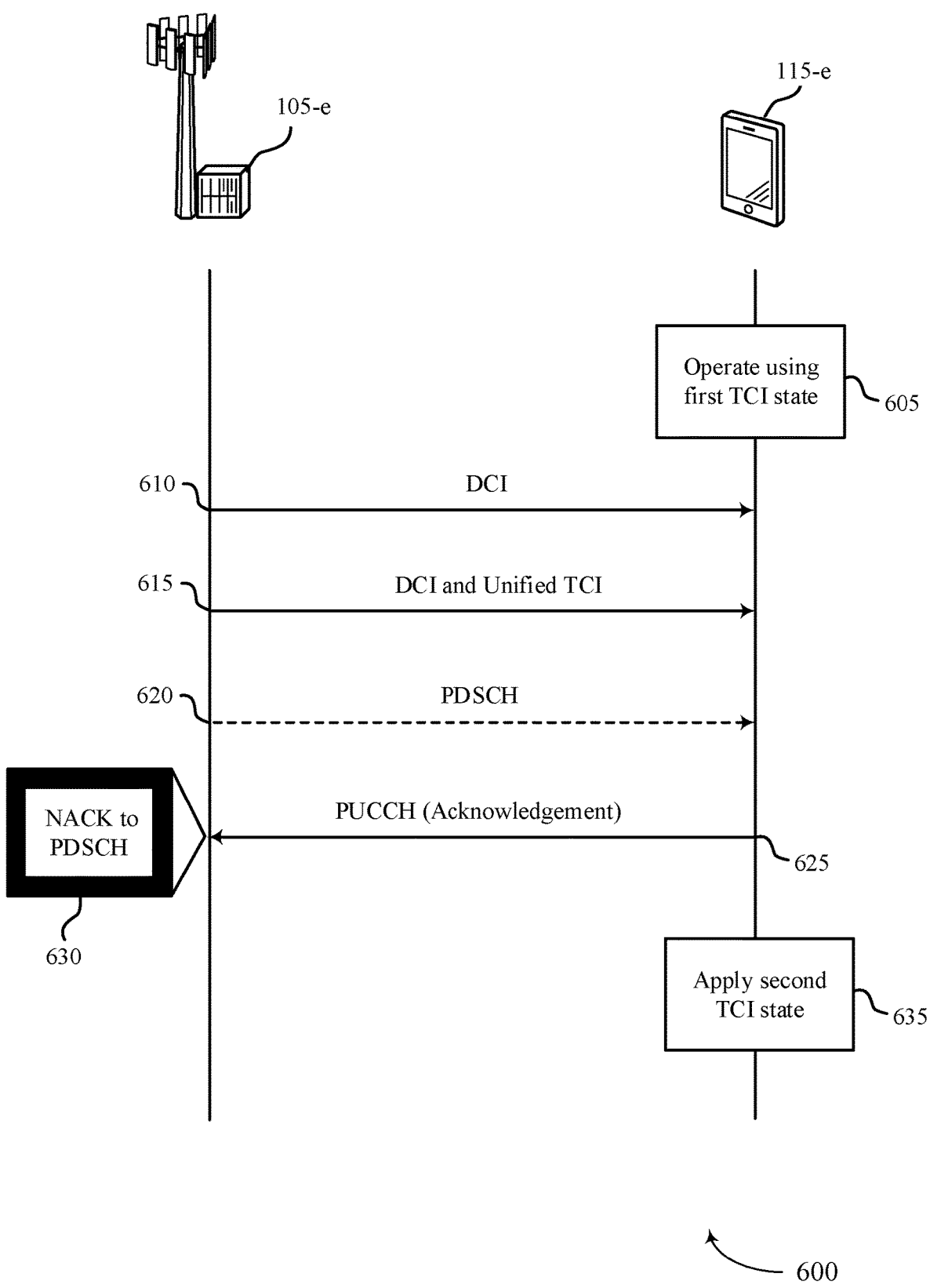

FIG. 6 illustrates an example of a process flow 600 that supports DCI based unified TCI acknowledgement in accordance with aspects of the present disclosure. Process flow 600 may implement aspects of FIGS. 1-5. For example, UE 115-*e* and a base station 105-*e* (which may be examples of a UE 115 and base station 105 described with reference to FIGS. 1-5) may implement processes of the process flow 600 to determine when the UE 115-*e* is to start using one or more TCI states (e.g., beams) indicated by the base station 105-*e* for communications with the base station 105-*e*. In some examples, the one or more TCI states may correspond to a unified TCI framework that indicates a common beam that can be used by the UE 115-*e* for at least one uplink channel (or uplink reference signal) and for at least one downlink channel (or downlink reference signal), a common beam that can be used by the UE 115-*e* for at least two downlink channels (or downlink reference signals), or a common beam that can be used by the UE 115-*e* for at least two uplink channels (or uplink reference signals). The UE 115-*e* may begin using the one or more TCI states after transmitting an acknowledgement of the DCI and one or more TCI states.

At 605, the UE 115-*e* may be operating in accordance with a first TCI state. For example, the UE 115-*e* may operate using a TCI state indicated via a first DCI received from the base station 105-*e* during a previous transmission time interval.

At 610, the base station 105-*e* may transmit a first DCI to the UE 115-*e*, and at 615, the base station 105-*e* may transmit a second DCI. In some cases, the second DCI may include a first indication of the one or more TCI states, such as an indication of a unified TCI state, for the UE 115-*e* to use for communications with the base station 105-*e*. In some examples, the second DCI may further include an additional indication of a scheduled downlink channel transmission (e.g., a PDSCH) and a downlink assignment index associated with the downlink channel, or one or more uplink channels scheduled for the UE 115-*e* to transmit (e.g., PUCCH). In accordance with the indication received in the DCI, at 620 the UE 115-*e* may receive (or attempt to receive) a downlink transmission (e.g., a PDSCH) from the base station 105-*e*. In some examples, the base station 105-*e* may transmit additional DCIs in addition to the first DCI and the second DCI. The second DCI in some cases may refer to a "last" received DCI among the DCIs which indicates the same transmission resources for a HARQ codebook information, or a DCI that is received temporally latest of the received DCIs.

In some cases, the UE 115-*e* may correctly receive the PDSCH and second DCI indicating the one or more TCI states, or, in some other cases, the UE 115-*e* may correctly receive the DCI indicating the one or more TCI states while incorrectly receiving the PDSCH. In either case, the UE 115-*e* may transmit an acknowledgement at 625 which may implicitly acknowledge receipt of the second DCI including the one or more TCI states.

In some cases, the UE 115-*e* and the base station 105-*e* may use transmission of the PUCCH as an implicit acknowledgment for the successful receipt of the one or more TCI states included in the second DCI. For example, the second DCI may indicate resources for transmission of the PUCCH and an associated HARQ codebook for feedback of the PDSCH. In some cases, the HARQ codebook of the PUCCH transmission carries ACK/NACK bits 630 associated with the scheduled PDSCH. In such examples, the base station 105-*e* may interpret any PUCCH transmission (e.g., ACK or NACK) for the PDSCH as an implicit acknowledgement of a successful receipt of the second DCI and the one or more TCI states.

Additionally, or alternatively, resources for the PUCCH transmission may be indicated uniquely based on the second DCI carrying the one or more TCI states. For example, if the base station 105-*e* receives the PUCCH on one or more resources indicated by the second DCI, the base station 105-*e* may interpret the received PUCCH as an implicit acknowledgment for the successful receipt of the one or more TCI states. In some cases, the base station 105-*e* may further identify DCI mis-detection in order to correctly receive the UE-sent HARQ codebook associated with the PDSCH.

At 635, the UE 115-*e* may apply the one or more TCI states (e.g., including at least a second TCI state different from the first TCI state) after transmitting the NACK to PDSCH 630 indicating the successful receipt of the second DCI and the one or more TCI states.

Figure 7:
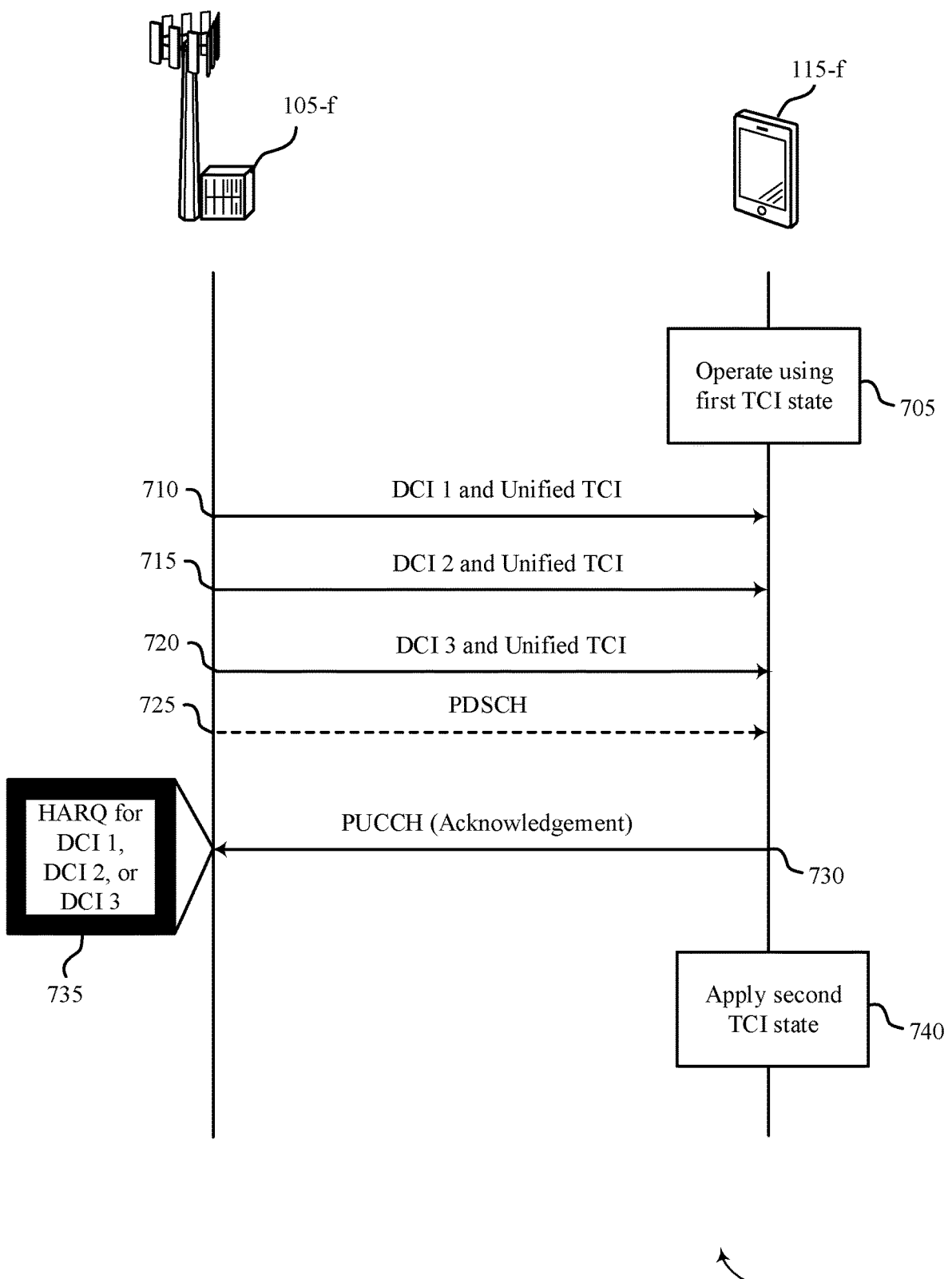

FIG. 7 illustrates an example of a process flow 700 that supports DCI based unified TCI acknowledgement in accordance with aspects of the present disclosure. Process flow 700 may implement aspects of FIGS. 1-6. For example, UE 115-*f* and a base station 105-*f* (which may be examples of a UE 115 and base station 105 described with reference to FIGS. 1-6) may implement processes of the process flow 700 to determine when the UE 115-*f* is to start using one or more TCI states (e.g., beams) indicated by the base station 105-*f* for communications with the base station 105-*f* In some examples, the one or more TCI states may correspond to a unified TCI framework that indicates a common beam that can be used by the UE 115-*f* for at least one uplink channel (or uplink reference signal) and for at least one downlink channel (or downlink reference signal), a common beam that can be used by the UE 115-*f* for at least two downlink channels (or downlink reference signals), or a common beam that can be used by the UE 115-*f* for at least two uplink channels (or uplink reference signals). The UE 115-*f* may begin using the one or more TCI states after transmitting an acknowledgement of the DCI and one or more TCI states.

At 705, the UE 115-*f* may be operating in accordance with a first TCI state. For example, the UE 115-*f* may operate using a TCI state indicated via a first DCI received from the base station 105-*f* during a previous transmission time interval.

In some cases, the UE 115-*f* may receive multiple DCI (e.g., DCI 1, DCI2, DCI3) from the base station 105-*f* which may be associated with a number of different downlink assignment indices, TCI states, HARQ codebooks, and other information. The UE 115-*f* may determine the last transmitted DCI (e.g., DCI 3), and may use information in the last DCI for transmitting feedback to the base station 105-*f*. In some cases, however, the UE 115-*f* may experience a misdetection of the last DCI, and may transmit a PUCCH and HARQ codebook based on a previous DCI received (e.g., DCI 2 or DCI1). If the UE 115-*f* determines to send feedback associated with the first DCI (e.g., on an associated PDSCH1), such feedback may prompt the UE 115-*f* to apply a TCI indication associated with the first DCI (e.g., TCI1). In such cases, the base station 105-*f* may not be able to determine whether the first DCI is received or not. The base station 105-*f* may reschedule the PDSCH, including a re-scheduling of the last DCI (e.g., DCI3) including the TCI indication associated with the last DCI (e.g., TCI3). Such cases, however, may pose a challenge to the UE 115-*f* in determining which TCI state to apply (e.g., TCI1 or TCI3), or in determining which TCI state is valid.

For layer 1-based beam indication using at least UE-specific (e.g., unicast) DCI to indicate joint or separate downlink/uplink beam indication for the active TCI states, the base station 105-*f* may determine the reception failure of the one or more TCI states for multiple DCI. In addition, the base station 105-*f* may indicate the one or more TCI states in DCIs scheduling an initial transmission and re-transmissions of the PDSCH. In some examples, the base station 105-*f* may send the same unified TCI state in different DCI until receiving an acknowledgement from the UE 115-*f*.

The base station 105-*f* may send a first DCI (DCI1) with the unified TCI state at 710, then the base station may send a second DCI (DCI2) with the unified TCI state at 715, and the base station 105-*f* may send a third DCI (DCI3) with the unified TCI state at 720. In some examples, the base station 105-*f* may transmit additional DCIs in addition to the first DCI, the second DCI, and the third DCI. In accordance with the indication received in the DCI, at 725 the UE 115-*f* may receive (or attempt to receive) a downlink transmission (e.g., a PDSCH) from the base station 105-*f*.

At 730, the UE 115-*f* may transmit an acknowledgement (e.g., an implicit or explicit acknowledgement as described herein) to acknowledge the receipt of at least one of the DCI. In some cases, the acknowledgement may be a HARQ message 735 for DCI1, DCI2, or DCI3.

At 735, the UE 115-*f* may apply the one or more TCI states (e.g., including at least a second TCI state different from the first TCI state) after transmitting the acknowledgement indicating the successful receipt of at least one DCI and the one or more TCI states.

FIG. 8 shows a block diagram 800 of a device 805 that supports DCI based unified TCI acknowledgement in accordance with aspects of the present disclosure. The device 805 may be an example of aspects of a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to DCI based unified TCI acknowledgement). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to DCI based unified TCI acknowledgement). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of DCI based unified TCI acknowledgement as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a UE in accordance with examples as disclosed herein. For example, the communications manager 820 may be configured as or otherwise support a means for receiving, from a base station, DCI scheduling a downlink shared channel, the DCI including a TCI state indicating a common beam for at least one channel. The communications manager 820 may be configured as or otherwise support a means for transmitting, to the base station, a feedback message for the downlink shared channel, where the feedback message acknowledges receipt of the TCI state. The communications manager 820 may be configured as or otherwise support a means for applying the TCI state after transmitting the feedback message acknowledging the receipt of the TCI state.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for more efficient utilization of communication resources and higher reliability associated with the acknowledgement of TCI information transmitted in a DCI.

Figure 9:
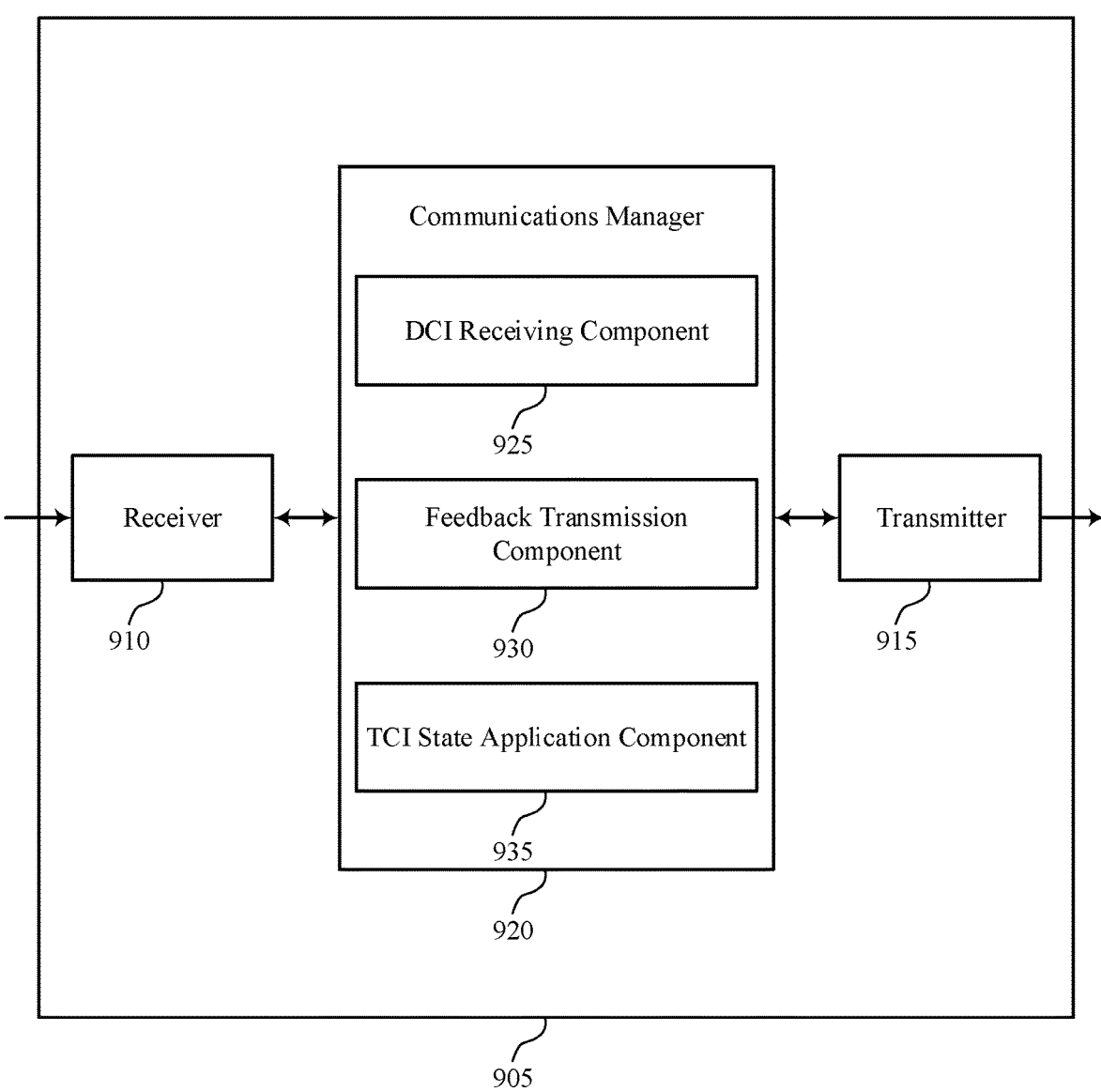

FIG. 9 shows a block diagram 900 of a device 905 that supports DCI based unified TCI acknowledgement in accordance with aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to DCI based unified TCI acknowledgement). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to DCI based unified TCI acknowledgement). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of DCI based unified TCI acknowledgement as described herein. For example, the communications manager 920 may include a DCI receiving component 925, a feedback transmission component 930, a TCI state application component 935, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a UE in accordance with examples as disclosed herein. The DCI receiving component 925 may be configured as or otherwise support a means for receiving, from a base station, DCI scheduling a downlink shared channel, the DCI including a TCI state indicating a common beam for at least one channel. The feedback transmission component 930 may be configured as or otherwise support a means for transmitting, to the base station, a feedback message for the downlink shared channel, where the feedback message acknowledges receipt of the TCI state. The TCI state application component 935 may be configured as or otherwise support a means for applying the TCI state after transmitting the feedback message acknowledging the receipt of the TCI state.

Figure 10:
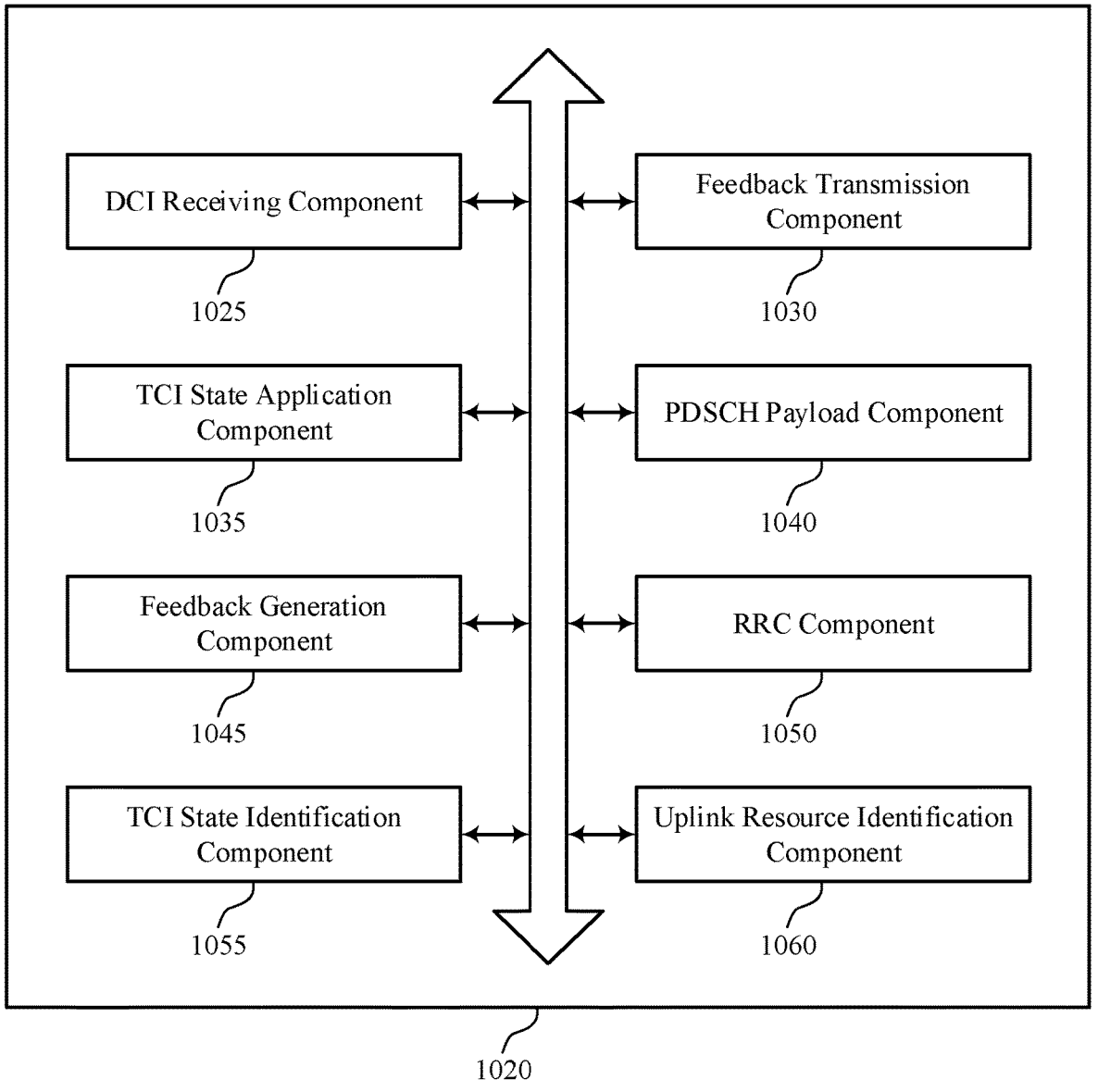
FIG. 10 shows a block diagram of a communications manager that supports downlink control information based unified transmission configuration indicator acknowledgement in accordance with aspects of the present disclosure.

FIG. 10 shows a block diagram 1000 of a communications manager 1020 that supports DCI based unified TCI acknowledgement in accordance with aspects of the present disclosure. The communications manager 1020 may be an example of aspects of a communications manager 820, a communications manager 920, or both, as described herein. The communications manager 1020, or various components thereof, may be an example of means for performing various aspects of DCI based unified TCI acknowledgement as described herein. For example, the communications manager 1020 may include a DCI receiving component 1025, a feedback transmission component 1030, a TCI state application component 1035, an PDSCH payload component 1040, a feedback generation component 1045, an RRC component 1050, a TCI state identification component 1055, an uplink resource identification component 1060, or any combination thereof. Each of these components may communicate, directly or indirectly, with one another (e.g., via one or more buses).

The communications manager 1020 may support wireless communications at a UE in accordance with examples as disclosed herein. The DCI receiving component 1025 may be configured as or otherwise support a means for receiving, from a base station, DCI scheduling a downlink shared channel, the DCI including a TCI state indicating a common beam for at least one channel. The feedback transmission component 1030 may be configured as or otherwise support a means for transmitting, to the base station, a feedback message for the downlink shared channel, where the feedback message acknowledges receipt of the TCI state. The TCI state application component 1035 may be configured as or otherwise support a means for applying the TCI state after transmitting the feedback message acknowledging the receipt of the TCI state.

In some examples, the PDSCH payload component 1040 may be configured as or otherwise support a means for determining that a payload of the downlink shared channel includes a single transport block. In some examples, the feedback transmission component 1030 may be configured as or otherwise support a means for transmitting, to the base station, a single positive acknowledgement bit for the downlink shared channel to acknowledge the receipt of the TCI state based on the determining.

In some examples, the PDSCH payload component 1040 may be configured as or otherwise support a means for determining that a payload of the downlink shared channel includes more than one transport block. In some examples, the feedback transmission component 1030 may be configured as or otherwise support a means for transmitting, to the base station, at least one positive acknowledgement bit for the downlink shared channel to acknowledge the receipt of the TCI state based on the determining.

In some examples, the PDSCH payload component 1040 may be configured as or otherwise support a means for determining that the downlink shared channel is configured with one or more code block groups. In some examples, the feedback transmission component 1030 may be configured as or otherwise support a means for transmitting, to the base station, at least one positive acknowledgement bit for the downlink shared channel to acknowledge the receipt of the TCI state based on the determining.

In some examples, the feedback generation component 1045 may be configured as or otherwise support a means for generating the feedback message as an enhanced acknowledgement message, the enhanced acknowledgement message including a set of positive acknowledgement bits. In some examples, the feedback transmission component 1030 may be configured as or otherwise support a means for transmitting, to the base station, the enhanced acknowledgement message to acknowledge the receipt of the TCI state based on the generating. In some examples, the enhanced acknowledgement message is associated with an HARQ type II codebook.

In some examples, the RRC component 1050 may be configured as or otherwise support a means for receiving, from the base station via a radio resource control message, an indication that the feedback message for the downlink shared channel includes a set of acknowledgement bits and an additional set of padded bits to acknowledge the receipt of the TCI state.

In some examples, to support transmitting the feedback message, the feedback generation component 1045 may be configured as or otherwise support a means for allocating the additional set of padded bits to a portion of a codebook for the downlink shared channel, the additional set of padded bits indicating a positive acknowledgement value. In some examples, to support transmitting the feedback message, the feedback transmission component 1030 may be configured as or otherwise support a means for transmitting, to the base station, at least the additional set of padded bits allocated to the portion of the codebook to acknowledge the receipt of the TCI state.

In some examples, a payload of the downlink shared channel includes more than one transport block, and the feedback transmission component 1030 may be configured as or otherwise support a means for transmitting, to the base station, a first positive acknowledgement bit for a first transport block, the first positive acknowledgement bit indicating the receipt of the downlink shared channel. In some examples, a payload of the downlink shared channel includes more than one transport block, and the feedback transmission component 1030 may be configured as or otherwise support a means for transmitting, to the base station, a second positive acknowledgement bit for a second transport block, the second positive acknowledgement bit indicating the receipt of both the downlink shared channel and the DCI.

In some examples, the feedback generation component 1045 may be configured as or otherwise support a means for generating a single positive acknowledgement bit dedicated for the DCI in accordance with an HARQ type I codebook. In some examples, the feedback transmission component 1030 may be configured as or otherwise support a means for transmitting, to the base station, the feedback message including the single positive acknowledgement bit to acknowledge the receipt of the TCI state based on the generating.

In some examples, the feedback transmission component 1030 may be configured as or otherwise support a means for transmitting the feedback message to the base station using a set of uplink control channel resources associated with the downlink shared channel, where the feedback message includes a first acknowledgement of the downlink shared channel and a second acknowledgement of the receipt of the TCI state. In some examples, the TCI state application component 1035 may be configured as or otherwise support a means for applying the TCI state after transmitting the feedback message, where the feedback message indicates the receipt of the TCI state.

In some examples, the set of uplink control channel resources is configured with a set of HARQ bits for transmitting the feedback message associated with the downlink shared channel. In some examples, the set of uplink control channel resources is indicated by the DCI.

In some examples, to support transmitting the feedback message, the TCI state identification component 1055 may be configured as or otherwise support a means for determining that the TCI state indicating the common beam is included in the DCI. In some examples, to support transmitting the feedback message, the uplink resource identification component 1060 may be configured as or otherwise support a means for identifying a set of uplink control channel resources in the DCI for transmitting the feedback message based on the DCI including the TCI state. In some examples, to support transmitting the feedback message, the feedback transmission component 1030 may be configured as or otherwise support a means for transmitting the feedback message to the base station using the set of uplink control channel resources to acknowledge the receipt of the TCI state.

In some examples, the TCI state identification component 1055 may be configured as or otherwise support a means for determining that the TCI state indicating the common beam is included in the DCI and the at least one other DCI. In some examples, the feedback transmission component 1030 may be configured as or otherwise support a means for transmitting the feedback message to the base station using the set of uplink control channel resources to acknowledge the receipt of the TCI state, or using a separate set of uplink control channel resources to acknowledge the receipt of the at least one other DCI.

In some examples, the TCI state indicating the common beam is included in the DCI based on the DCI being received after the at least one other DCI. In some examples, the TCI state indicates a joint indication or separate indications for the at least one channel. In some examples, the TCI state indicating the common beam includes a layer-1 (L1) based beam indication.

Figure 11:
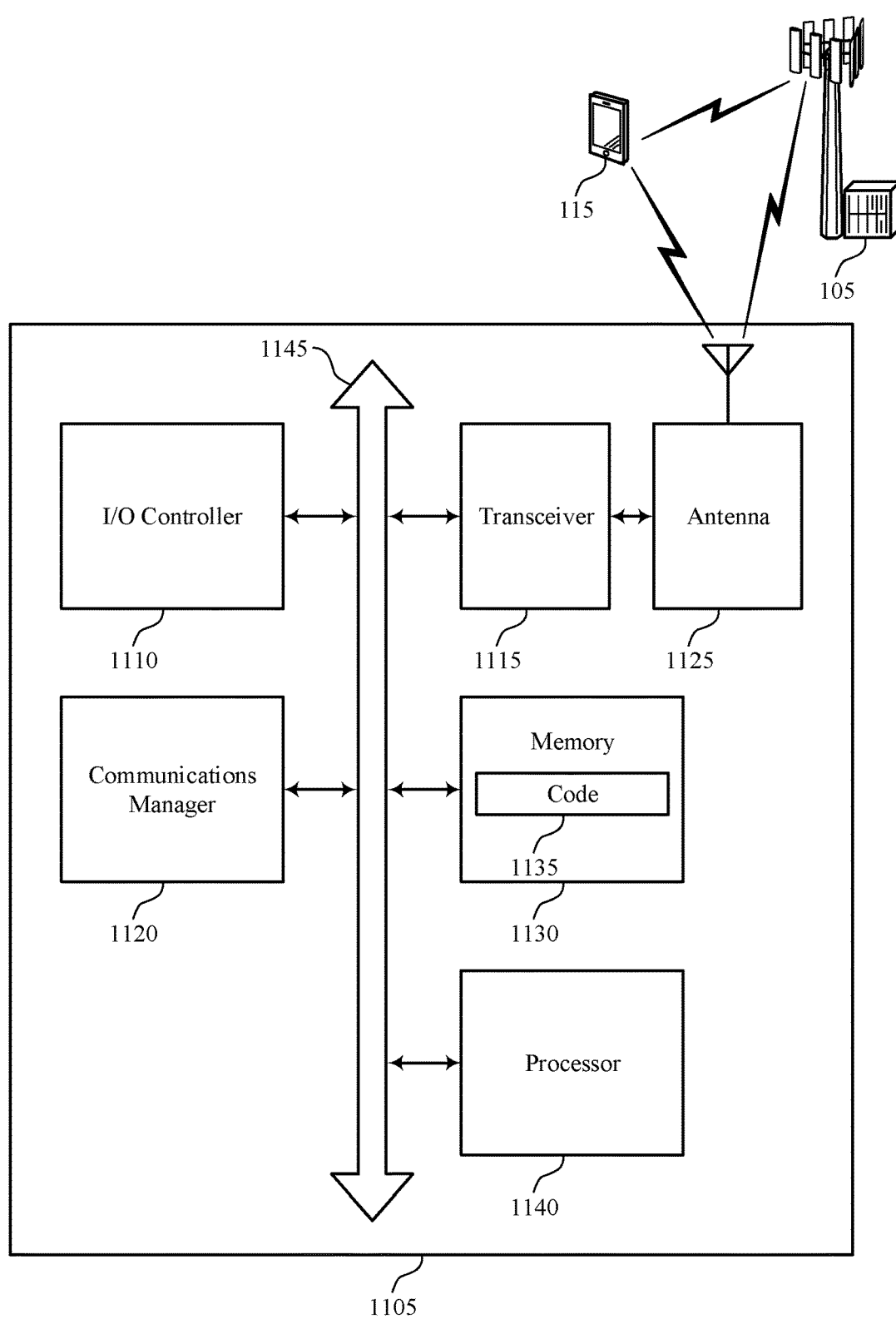
FIG. 11 shows a diagram of a system including a device that supports downlink control information based unified transmission configuration indicator acknowledgement in accordance with aspects of the present disclosure.

FIG. 11 shows a diagram of a system 1100 including a device 1105 that supports DCI based unified TCI acknowledgement in accordance with aspects of the present disclosure. The device 1105 may be an example of or include the components of a device 805, a device 905, or a UE 115 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125.

The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting DCI based unified TCI acknowledgement). For example, the device 1105 or a component of the device 1105 may include a processor 1140 and memory 1130 coupled to the processor 1140, the processor 1140 and memory 1130 configured to perform various functions described herein.

The communications manager 1120 may support wireless communications at a UE in accordance with examples as disclosed herein. For example, the communications manager 1120 may be configured as or otherwise support a means for receiving, from a base station, DCI scheduling a downlink shared channel, the DCI including a TCI state indicating a common beam for at least one channel. The communications manager 1120 may be configured as or otherwise support a means for transmitting, to the base station, a feedback message for the downlink shared channel, where the feedback message acknowledges receipt of the TCI state. The communications manager 1120 may be configured as or otherwise support a means for applying the TCI state after transmitting the feedback message acknowledging the receipt of the TCI state.

By including or configuring the communications manager 1120 in accordance with examples as described herein, the device 1105 may support techniques for improved communication reliability, reduced latency, more efficient utilization of communication resources, and improved coordination between devices. For example, based on an implicit or explicit acknowledgement for receipt of the TCI in DCI, excessive retransmissions of DCI may be reduced.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of DCI based unified TCI acknowledgement as described herein, or the processor 1140 and the memory 1130 may be otherwise configured to perform or support such operations.

Figure 12:
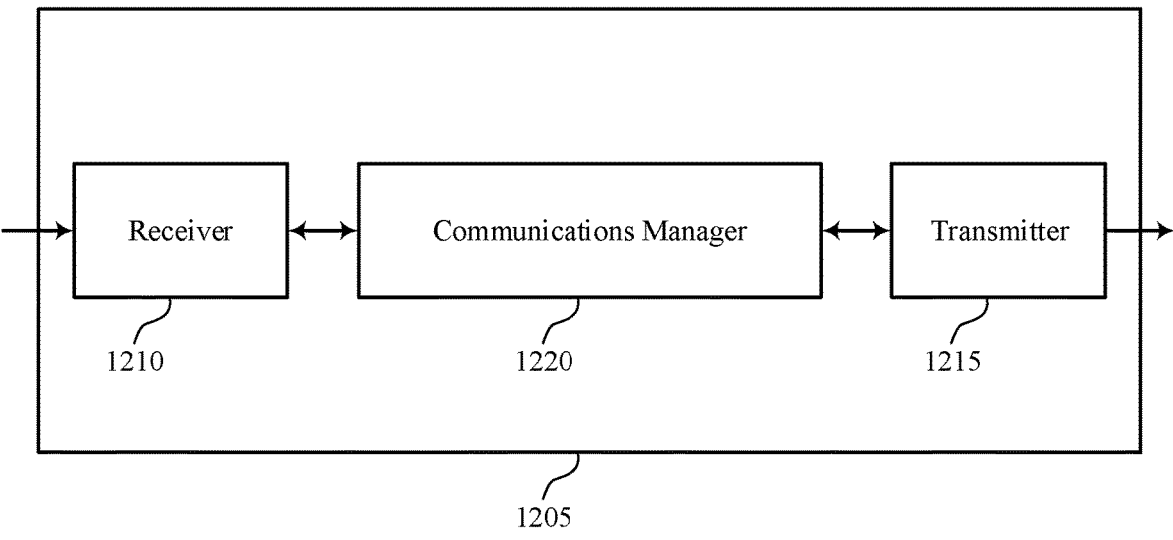
FIGS. 12 and 13 show block diagrams of devices that support downlink control information based unified transmission configuration indicator acknowledgement in accordance with aspects of the present disclosure.

FIG. 12 shows a block diagram 1200 of a device 1205 that supports DCI based unified TCI acknowledgement in accordance with aspects of the present disclosure. The device 1205 may be an example of aspects of a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to DCI based unified TCI acknowledgement). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to DCI based unified TCI acknowledgement). In some examples, the transmitter 1215 may be co-located with a receiver 1210 in a transceiver module. The transmitter 1215 may utilize a single antenna or a set of multiple antennas.

The communications manager 1220, the receiver 1210, the transmitter 1215, or various combinations thereof or various components thereof may be examples of means for performing various aspects of DCI based unified TCI acknowledgement as described herein. For example, the communications manager 1220, the receiver 1210, the transmitter 1215, or various combinations or components thereof may support a method for performing one or more of the functions described herein.

In some examples, the communications manager 1220, the receiver 1210, the transmitter 1215, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1220, the receiver 1210, the transmitter 1215, or various combinations or components thereof may be implemented in code (e.g., as communications management software or firmware) executed by a processor. If implemented in code executed by a processor, the functions of the communications manager 1220, the receiver 1210, the transmitter 1215, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1220 may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communications at a base station in accordance with examples as disclosed herein. For example, the communications manager 1220 may be configured as or otherwise support a means for transmitting, to a UE, DCI scheduling a downlink shared channel, the DCI including a TCI state indicating a common beam for at least one channel. The communications manager 1220 may be configured as or otherwise support a means for receiving, from the UE, a feedback message for the downlink shared channel, where the feedback message acknowledges receipt of the TCI state by the UE.

By including or configuring the communications manager 1220 in accordance with examples as described herein, the device 1205 (e.g., a processor controlling or otherwise coupled to the receiver 1210, the transmitter 1215, the communications manager 1220, or a combination thereof) may support techniques for more efficient utilization of communication resources, increased device efficiency, reduced signaling overhead, among other benefits.

Figure 13:
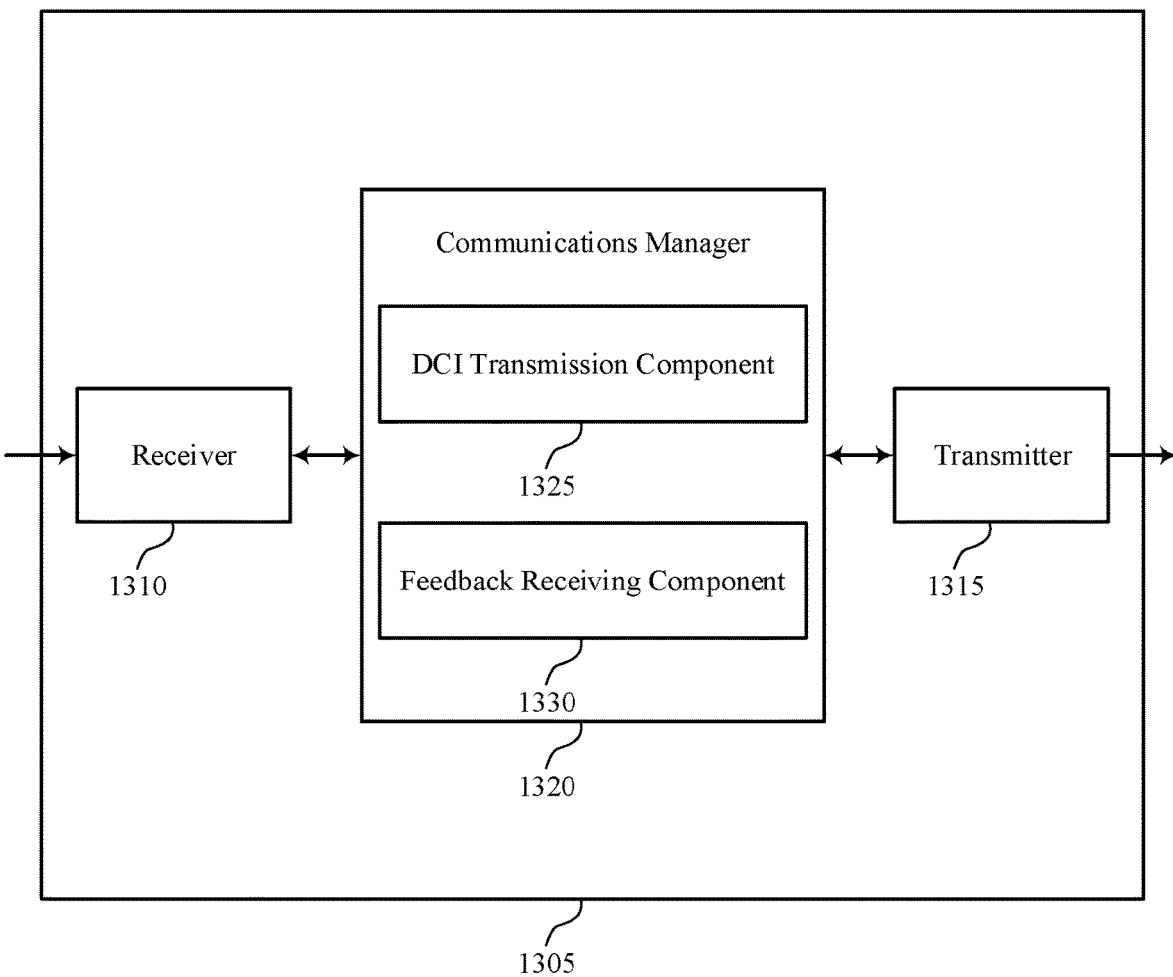

FIG. 13 shows a block diagram 1300 of a device 1305 that supports DCI based unified TCI acknowledgement in accordance with aspects of the present disclosure. The device 1305 may be an example of aspects of a device 1205 or a base station 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to DCI based unified TCI acknowledgement). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to DCI based unified TCI acknowledgement). In some examples, the transmitter 1315 may be co-located with a receiver 1310 in a transceiver module. The transmitter 1315 may utilize a single antenna or a set of multiple antennas.

The device 1305, or various components thereof, may be an example of means for performing various aspects of DCI based unified TCI acknowledgement as described herein. For example, the communications manager 1320 may include a DCI transmission component 1325 a feedback receiving component 1330, or any combination thereof. The communications manager 1320 may be an example of aspects of a communications manager 1220 as described herein. In some examples, the communications manager 1320, or various components thereof, may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communications at a base station in accordance with examples as disclosed herein. The DCI transmission component 1325 may be configured as or otherwise support a means for transmitting, to a UE, DCI scheduling a downlink shared channel, the DCI including a TCI state indicating a common beam for at least one channel. The feedback receiving component 1330 may be configured as or otherwise support a means for receiving, from the UE, a feedback message for the downlink shared channel, where the feedback message acknowledges receipt of the TCI state by the UE.

Figure 14:
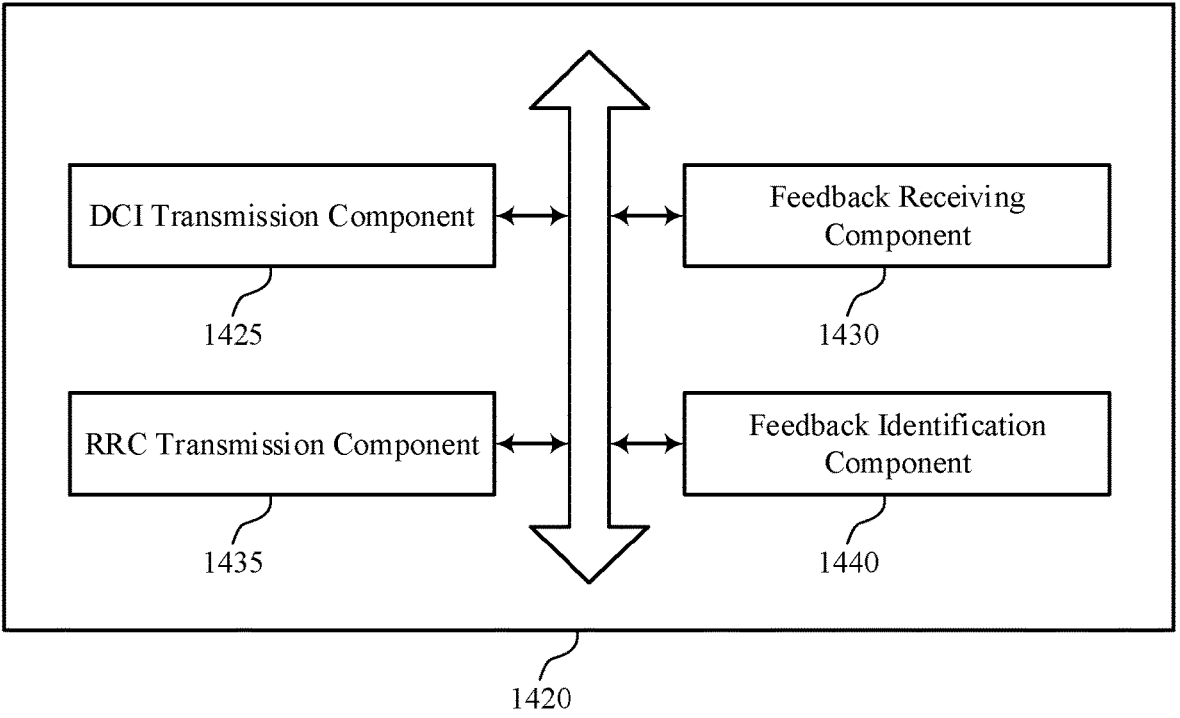
FIG. 14 shows a block diagram of a communications manager that supports downlink control information based unified transmission configuration indicator acknowledgement in accordance with aspects of the present disclosure.

FIG. 14 shows a block diagram 1400 of a communications manager 1420 that supports DCI based unified TCI acknowledgement in accordance with aspects of the present disclosure. The communications manager 1420 may be an example of aspects of a communications manager 1220, a communications manager 1320, or both, as described herein. The communications manager 1420, or various components thereof, may be an example of means for performing various aspects of DCI based unified TCI acknowledgement as described herein. For example, the communications manager 1420 may include a DCI transmission component 1425, a feedback receiving component 1430, an RRC transmission component 1435, a feedback identification component 1440, or any combination thereof. Each of these components may communicate, directly or indirectly, with one another (e.g., via one or more buses).

The communications manager 1420 may support wireless communications at a base station in accordance with examples as disclosed herein. The DCI transmission component 1425 may be configured as or otherwise support a means for transmitting, to a UE, DCI scheduling a downlink shared channel, the DCI including a TCI state indicating a common beam for at least one channel. The feedback receiving component 1430 may be configured as or otherwise support a means for receiving, from the UE, a feedback message for the downlink shared channel, where the feedback message acknowledges receipt of the TCI state by the UE.

In some examples, the DCI transmission component 1425 may be configured as or otherwise support a means for transmitting the downlink shared channel in a single transport block. In some examples, the feedback receiving component 1430 may be configured as or otherwise support a means for receiving, from the UE, a single positive acknowledgement bit for the downlink shared channel acknowledging the receipt of the TCI state based on the transmitting.

In some examples, the DCI transmission component 1425 may be configured as or otherwise support a means for transmitting the downlink shared channel in more than one transport block. In some examples, the feedback receiving component 1430 may be configured as or otherwise support a means for receiving, by the UE, at least one positive acknowledgement bit for the downlink shared channel acknowledging the receipt of the TCI state based on the transmitting.

In some examples, the DCI transmission component 1425 may be configured as or otherwise support a means for transmitting the downlink shared channel in one or more code block groups. In some examples, the feedback receiving component 1430 may be configured as or otherwise support a means for receiving, from the UE, at least one positive acknowledgement bit for the downlink shared channel acknowledging the receipt of the TCI state based on the transmitting.

In some examples, the feedback receiving component 1430 may be configured as or otherwise support a means for receiving, from the UE, the feedback message as an enhanced acknowledgement message including a set of positive acknowledgement bits, where the enhanced acknowledgement message acknowledges the receipt of the TCI state.

In some examples, the enhanced acknowledgement message is associated with an HARQ type II codebook.

In some examples, the RRC transmission component 1435 may be configured as or otherwise support a means for transmitting, to UE via a radio resource control message, an indication that the feedback message for the downlink shared channel includes a set of acknowledgement bits and an additional set of padded bits to acknowledge the receipt of the TCI state.

In some examples, to support receiving the feedback message, the feedback identification component 1440 may be configured as or otherwise support a means for receiving, from the UE, the additional set of padded bits in a portion of a codebook for the downlink shared channel, the additional set of padded bits indicating a positive acknowledgement value acknowledging the receipt of the TCI state.

In some examples, a payload of the downlink shared channel includes more than one transport block, and the feedback receiving component 1430 may be configured as or otherwise support a means for receiving, from the UE, a first positive acknowledgement bit for a first transport block, the first positive acknowledgement bit indicating the receipt of the downlink shared channel. In some examples, a payload of the downlink shared channel includes more than one transport block, and the feedback receiving component 1430 may be configured as or otherwise support a means for receiving, from the UE, a second positive acknowledgement bit for a second transport block, the second positive acknowledgement bit indicating the receipt of both the downlink shared channel and the DCI.

In some examples, the feedback receiving component 1430 may be configured as or otherwise support a means for receiving, from the UE, the feedback message including a single positive acknowledgement bit dedicated for the DCI in accordance with an HARQ type I codebook, where the single positive acknowledgement bit acknowledges receipt of the TCI state.

In some examples, the feedback receiving component 1430 may be configured as or otherwise support a means for receiving the feedback message from the UE on a set of uplink control channel resources associated with the downlink shared channel, where the feedback message includes a first acknowledgement of the downlink shared channel and a second acknowledgement of the receipt of the TCI state.

In some examples, the set of uplink control channel resources is configured with a set of HARQ bits for transmitting the feedback message associated with the downlink shared channel.

In some examples, the set of uplink control channel resources is indicated by the DCI.

In some examples, to support receiving the feedback message, the DCI transmission component 1425 may be configured as or otherwise support a means for transmitting, in the DCI, the TCI state indicating the common beam and an indication of a set of uplink control channel resources for the feedback message based on the DCI including the TCI state. In some examples, to support receiving the feedback message, the feedback receiving component 1430 may be configured as or otherwise support a means for receiving the feedback message from the UE to acknowledge the receipt of the TCI state on the set of uplink control channel resources.

In some examples, the DCI transmission component 1425 may be configured as or otherwise support a means for transmitting the TCI state indicating the common beam in the DCI and the at least one other DCI. In some examples, the feedback receiving component 1430 may be configured as or otherwise support a means for receiving the feedback message from the UE on the set of uplink control channel resources to acknowledge the receipt of the TCI state, or on a separate set of uplink control channel resources to acknowledge the receipt of the at least one other DCI.

In some examples, the TCI state indicating the common beam is included in the DCI based on the DCI being transmitted after the at least one other DCI.

In some examples, the TCI state indicates a joint indication or separate indications for the at least one channel.

In some examples, the TCI state indicating the common beam includes a layer-1 based beam indication.

Figure 15:
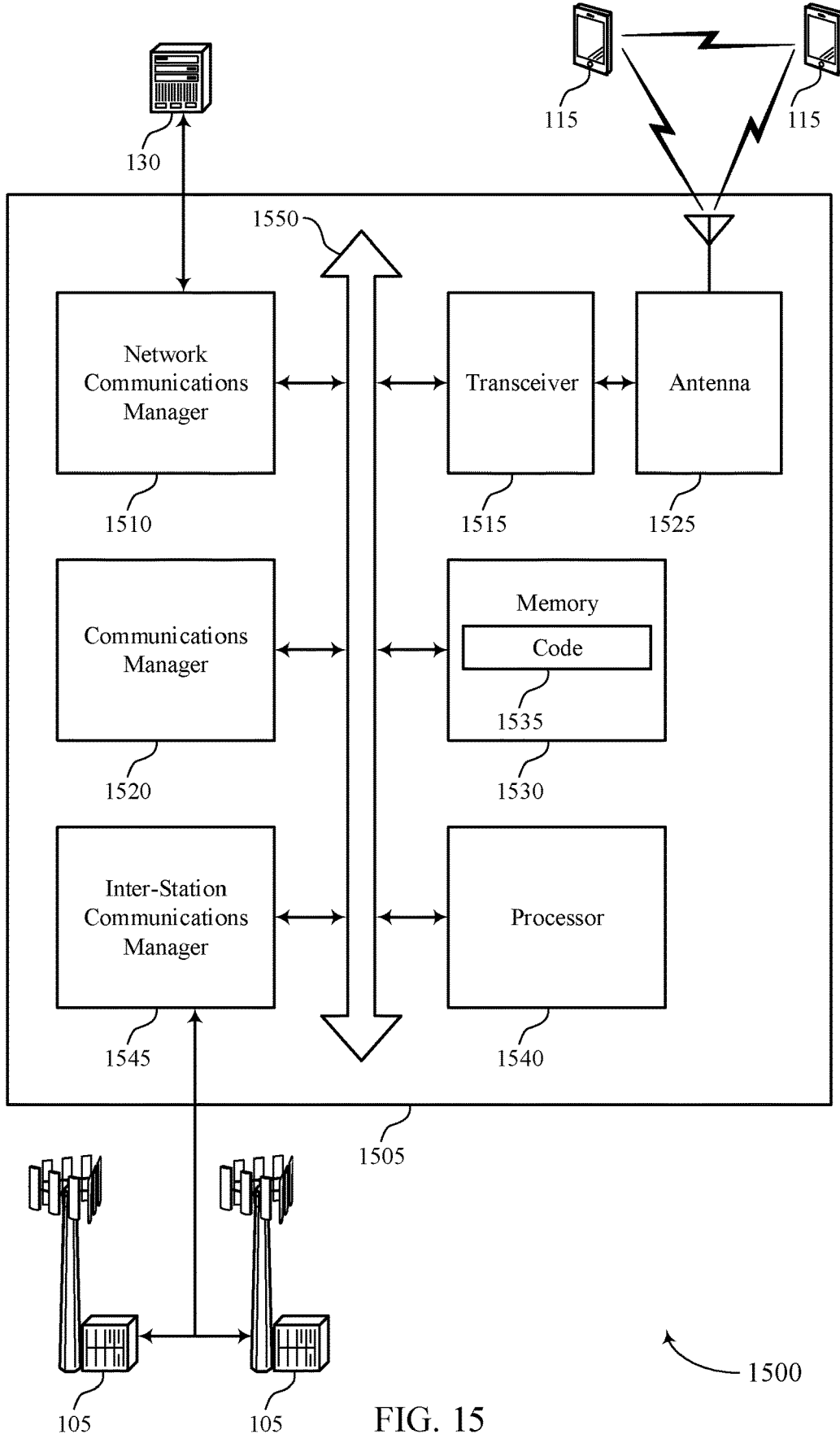
FIG. 15 shows a diagram of a system including a device that supports downlink control information based unified transmission configuration indicator acknowledgement in accordance with aspects of the present disclosure.

FIG. 15 shows a diagram of a system 1500 including a device 1505 that supports DCI based unified TCI acknowledgement in accordance with aspects of the present disclosure. The device 1505 may be an example of or include the components of a device 1205, a device 1305, or a base station 105 as described herein. The device 1505 may communicate wirelessly with one or more base stations 105, UEs 115, or any combination thereof. The device 1505 may include components for bi-directional voice and data communications including components for transmitting and receiving communications, such as a communications manager 1520, a network communications manager 1510, a transceiver 1515, an antenna 1525, a memory 1530, code 1535, a processor 1540, and an inter-station communications manager 1545. These components may be in electronic communication or otherwise coupled (e.g., operatively, communicatively, functionally, electronically, electrically) via one or more buses (e.g., a bus 1550).

The network communications manager 1510 may manage communications with a core network 130 (e.g., via one or more wired backhaul links). For example, the network communications manager 1510 may manage the transfer of data communications for client devices, such as one or more UEs 115.

In some cases, the device 1505 may include a single antenna 1525. However, in some other cases the device 1505 may have more than one antenna 1525, which may be capable of concurrently transmitting or receiving multiple wireless transmissions. The transceiver 1515 may communicate bi-directionally, via the one or more antennas 1525, wired, or wireless links as described herein. For example, the transceiver 1515 may represent a wireless transceiver and may communicate bi-directionally with another wireless transceiver. The transceiver 1515 may also include a modem to modulate the packets, to provide the modulated packets to one or more antennas 1525 for transmission, and to demodulate packets received from the one or more antennas 1525. The transceiver 1515, or the transceiver 1515 and one or more antennas 1525, may be an example of a transmitter 1215, a transmitter 1315, a receiver 1210, a receiver 1310, or any combination thereof or component thereof, as described herein.

The memory 1530 may include RAM and ROM. The memory 1530 may store computer-readable, computer-executable code 1535 including instructions that, when executed by the processor 1540, cause the device 1505 to perform various functions described herein. The code 1535 may be stored in a non-transitory computer-readable medium such as system memory or another type of memory. In some cases, the code 1535 may not be directly executable by the processor 1540 but may cause a computer (e.g., when compiled and executed) to perform functions described herein. In some cases, the memory 1530 may contain, among other things, a BIOS which may control basic hardware or software operation such as the interaction with peripheral components or devices.

The processor 1540 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some other cases, a memory controller may be integrated into the processor 1540. The processor 1540 may be configured to execute computer-readable instructions stored in a memory (e.g., the memory 1530) to cause the device 1505 to perform various functions (e.g., functions or tasks supporting DCI based unified TCI acknowledgement). For example, the device 1505 or a component of the device 1505 may include a processor 1540 and memory 1530 coupled to the processor 1540, the processor 1540 and memory 1530 configured to perform various functions described herein.

The inter-station communications manager 1545 may manage communications with other base stations 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communications network technology to provide communication between base stations 105.

The communications manager 1520 may support wireless communications at a base station in accordance with examples as disclosed herein. For example, the communications manager 1520 may be configured as or otherwise support a means for transmitting, to a UE, DCI scheduling a downlink shared channel, the DCI including a TCI state indicating a common beam for at least one channel. The communications manager 1520 may be configured as or otherwise support a means for receiving, from the UE, a feedback message for the downlink shared channel, where the feedback message acknowledges receipt of the TCI state by the UE.

By including or configuring the communications manager 1520 in accordance with examples as described herein, the device 1505 may support techniques for improved communication reliability, reduced latency, more efficient utilization of communication resources, improved coordination between devices, reduced signaling overhead, among other benefits.

In some examples, the communications manager 1520 may be configured to perform various operations (e.g., receiving, monitoring, transmitting) using or otherwise in cooperation with the transceiver 1515, the one or more antennas 1525, or any combination thereof. Although the communications manager 1520 is illustrated as a separate component, in some examples, one or more functions described with reference to the communications manager 1520 may be supported by or performed by the processor 1540, the memory 1530, the code 1535, or any combination thereof. For example, the code 1535 may include instructions executable by the processor 1540 to cause the device 1505 to perform various aspects of DCI based unified TCI acknowledgement as described herein, or the processor 1540 and the memory 1530 may be otherwise configured to perform or support such operations.

FIG. 16 shows a flowchart illustrating a method 1600 that supports DCI based unified TCI acknowledgement in accordance with aspects of the present disclosure. The operations of the method 1600 may be implemented by a UE or its components as described herein. For example, the operations of the method 1600 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1605, the method may include receiving, from a base station, DCI scheduling a downlink shared channel, the DCI including a TCI state indicating a common beam for at least one channel. The operations of 1605 may be performed in accordance with examples as disclosed herein. In some examples, aspects of the operations of 1605 may be performed by a DCI receiving component 1025 as described with reference to FIG. 10.

At 1610, the method may include transmitting, to the base station, a feedback message for the downlink shared channel, where the feedback message acknowledges receipt of the TCI state. The operations of 1610 may be performed in accordance with examples as disclosed herein. In some examples, aspects of the operations of 1610 may be performed by a feedback transmission component 1030 as described with reference to FIG. 10.

At 1615, the method may include applying the TCI state after transmitting the feedback message acknowledging the receipt of the TCI state. The operations of 1615 may be performed in accordance with examples as disclosed herein. In some examples, aspects of the operations of 1615 may be performed by a TCI state application component 1035 as described with reference to FIG. 10.

FIG. 17 shows a flowchart illustrating a method 1700 that supports DCI based unified TCI acknowledgement in accordance with aspects of the present disclosure. The operations of the method 1700 may be implemented by a UE or its components as described herein. For example, the operations of the method 1700 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1705, the method may include receiving, from a base station, DCI scheduling a downlink shared channel, the DCI including a TCI state indicating a common beam for at least one channel. The operations of 1705 may be performed in accordance with examples as disclosed herein. In some examples, aspects of the operations of 1705 may be performed by a DCI receiving component 1025 as described with reference to FIG. 10.

At 1710, the method may include determining that a payload of the downlink shared channel includes a single transport block. The operations of 1710 may be performed in accordance with examples as disclosed herein. In some examples, aspects of the operations of 1710 may be performed by an PDSCH payload component 1040 as described with reference to FIG. 10.

At 1715, the method may include transmitting, to the base station, a single positive acknowledgement bit for the downlink shared channel to acknowledge the receipt of the TCI state based on the determining. The operations of 1715 may be performed in accordance with examples as disclosed herein. In some examples, aspects of the operations of 1715 may be performed by a feedback transmission component 1030 as described with reference to FIG. 10.

At 1720, the method may include transmitting, to the base station, a feedback message for the downlink shared channel, where the feedback message acknowledges receipt of the TCI state. The operations of 1720 may be performed in accordance with examples as disclosed herein. In some examples, aspects of the operations of 1720 may be performed by a feedback transmission component 1030 as described with reference to FIG. 10.

At 1725, the method may include applying the TCI state after transmitting the feedback message acknowledging the receipt of the TCI state. The operations of 1725 may be performed in accordance with examples as disclosed herein. In some examples, aspects of the operations of 1725 may be performed by a TCI state application component 1035 as described with reference to FIG. 10.

FIG. 18 shows a flowchart illustrating a method 1800 that supports DCI based unified TCI acknowledgement in accordance with aspects of the present disclosure. The operations of the method 1800 may be implemented by a UE or its components as described herein. For example, the operations of the method 1800 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1805, the method may include receiving, from a base station, DCI scheduling a downlink shared channel, the DCI including a TCI state indicating a common beam for at least one channel. The operations of 1805 may be performed in accordance with examples as disclosed herein. In some examples, aspects of the operations of 1805 may be performed by a DCI receiving component 1025 as described with reference to FIG. 10.

At 1810, the method may include generating the feedback message as an enhanced acknowledgement message, the enhanced acknowledgement message including a set of positive acknowledgement bits. The operations of 1810 may be performed in accordance with examples as disclosed herein. In some examples, aspects of the operations of 1810 may be performed by a feedback generation component 1045 as described with reference to FIG. 10.

At 1815, the method may include transmitting, to the base station, the enhanced acknowledgement message to acknowledge the receipt of the TCI state based on the generating. The operations of 1815 may be performed in accordance with examples as disclosed herein. In some examples, aspects of the operations of 1815 may be performed by a feedback transmission component 1030 as described with reference to FIG. 10.

At 1820, the method may include transmitting, to the base station, a feedback message for the downlink shared channel, where the feedback message acknowledges receipt of the TCI state. The operations of 1820 may be performed in accordance with examples as disclosed herein. In some examples, aspects of the operations of 1820 may be performed by a feedback transmission component 1030 as described with reference to FIG. 10.

At 1825, the method may include applying the TCI state after transmitting the feedback message acknowledging the receipt of the TCI state. The operations of 1825 may be performed in accordance with examples as disclosed herein. In some examples, aspects of the operations of 1825 may be performed by a TCI state application component 1035 as described with reference to FIG. 10.

FIG. 19 shows a flowchart illustrating a method 1900 that supports DCI based unified TCI acknowledgement in accordance with aspects of the present disclosure. The operations of the method 1900 may be implemented by a UE or its components as described herein. For example, the operations of the method 1900 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 1905, the method may include receiving, from a base station, DCI scheduling a downlink shared channel, the DCI including a TCI state indicating a common beam for at least one channel. The operations of 1905 may be performed in accordance with examples as disclosed herein. In some examples, aspects of the operations of 1905 may be performed by a DCI receiving component 1025 as described with reference to FIG. 10.

At 1910, the method may include receiving, from the base station via a radio resource control message, an indication that the feedback message for the downlink shared channel includes a set of acknowledgement bits and an additional set of padded bits to acknowledge the receipt of the TCI state. The operations of 1910 may be performed in accordance with examples as disclosed herein. In some examples, aspects of the operations of 1910 may be performed by an RRC component 1050 as described with reference to FIG. 10.

At 1915, the method may include allocating the additional set of padded bits to a portion of a codebook for the downlink shared channel, the additional set of padded bits indicating a positive acknowledgement value. The operations of 1915 may be performed in accordance with examples as disclosed herein. In some examples, aspects of the operations of 1915 may be performed by a feedback generation component 1045 as described with reference to FIG. 10.

At 1920, the method may include transmitting, to the base station, at least the additional set of padded bits allocated to the portion of the codebook to acknowledge the receipt of the TCI state. The operations of 1920 may be performed in accordance with examples as disclosed herein. In some examples, aspects of the operations of 1920 may be performed by a feedback transmission component 1030 as described with reference to FIG. 10.

At 1925, the method may include transmitting, to the base station, a feedback message for the downlink shared channel, where the feedback message acknowledges receipt of the TCI state. The operations of 1925 may be performed in accordance with examples as disclosed herein. In some examples, aspects of the operations of 1925 may be performed by a feedback transmission component 1030 as described with reference to FIG. 10.

At 1930, the method may include applying the TCI state after transmitting the feedback message acknowledging the receipt of the TCI state. The operations of 1930 may be performed in accordance with examples as disclosed herein. In some examples, aspects of the operations of 1930 may be performed by a TCI state application component 1035 as described with reference to FIG. 10.

FIG. 20 shows a flowchart illustrating a method 2000 that supports DCI based unified TCI acknowledgement in accordance with aspects of the present disclosure. The operations of the method 2000 may be implemented by a UE or its components as described herein. For example, the operations of the method 2000 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 2005, the method may include receiving, from a base station, DCI scheduling a downlink shared channel, the DCI including a TCI state indicating a common beam for at least one channel. The operations of 2005 may be performed in accordance with examples as disclosed herein. In some examples, aspects of the operations of 2005 may be performed by a DCI receiving component 1025 as described with reference to FIG. 10.

At 2010, the method may include generating a single positive acknowledgement bit dedicated for the DCI in accordance with an HARQ type I codebook. The operations of 2010 may be performed in accordance with examples as disclosed herein. In some examples, aspects of the operations of 2010 may be performed by a feedback generation component 1045 as described with reference to FIG. 10.

At 2015, the method may include transmitting, to the base station, the feedback message including the single positive acknowledgement bit to acknowledge the receipt of the TCI state based on the generating. The operations of 2015 may be performed in accordance with examples as disclosed herein. In some examples, aspects of the operations of 2015 may be performed by a feedback transmission component 1030 as described with reference to FIG. 10.

At 2020, the method may include transmitting, to the base station, a feedback message for the downlink shared channel, where the feedback message acknowledges receipt of the TCI state. The operations of 2020 may be performed in accordance with examples as disclosed herein. In some examples, aspects of the operations of 2020 may be performed by a feedback transmission component 1030 as described with reference to FIG. 10.

At 2025, the method may include applying the TCI state after transmitting the feedback message acknowledging the receipt of the TCI state. The operations of 2025 may be performed in accordance with examples as disclosed herein.

In some examples, aspects of the operations of 2025 may be performed by a TCI state application component 1035 as described with reference to FIG. 10.

FIG. 21 shows a flowchart illustrating a method 2100 that supports DCI based unified TCI acknowledgement in accordance with aspects of the present disclosure. The operations of the method 2100 may be implemented by a UE or its components as described herein. For example, the operations of the method 2100 may be performed by a UE 115 as described with reference to FIGS. 1 through 11. In some examples, a UE may execute a set of instructions to control the functional elements of the UE to perform the described functions. Additionally, or alternatively, the UE may perform aspects of the described functions using special-purpose hardware.

At 2105, the method may include receiving, from a base station, DCI scheduling a downlink shared channel, the DCI including a TCI state indicating a common beam for at least one channel. The operations of 2105 may be performed in accordance with examples as disclosed herein. In some examples, aspects of the operations of 2105 may be performed by a DCI receiving component 1025 as described with reference to FIG. 10.

At 2110, the method may include determining that the TCI state indicating the common beam is included in the DCI. The operations of 2110 may be performed in accordance with examples as disclosed herein. In some examples, aspects of the operations of 2110 may be performed by a TCI state identification component 1055 as described with reference to FIG. 10.

At 2115, the method may include transmitting, to the base station, a feedback message for the downlink shared channel, where the feedback message acknowledges receipt of the TCI state. The operations of 2115 may be performed in accordance with examples as disclosed herein. In some examples, aspects of the operations of 2115 may be performed by a feedback transmission component 1030 as described with reference to FIG. 10.

At 2120, the method may include identifying a set of uplink control channel resources in the DCI for transmitting the feedback message based on the DCI including the TCI state. The operations of 2120 may be performed in accordance with examples as disclosed herein. In some examples, aspects of the operations of 2120 may be performed by an uplink resource identification component 1060 as described with reference to FIG. 10.

At 2125, the method may include transmitting the feedback message to the base station using the set of uplink control channel resources to acknowledge the receipt of the TCI state. The operations of 2125 may be performed in accordance with examples as disclosed herein. In some examples, aspects of the operations of 2125 may be performed by a feedback transmission component 1030 as described with reference to FIG. 10.

At 2130, the method may include applying the TCI state after transmitting the feedback message acknowledging the receipt of the TCI state. The operations of 2130 may be performed in accordance with examples as disclosed herein. In some examples, aspects of the operations of 2130 may be performed by a TCI state application component 1035 as described with reference to FIG. 10.

Figure 22:
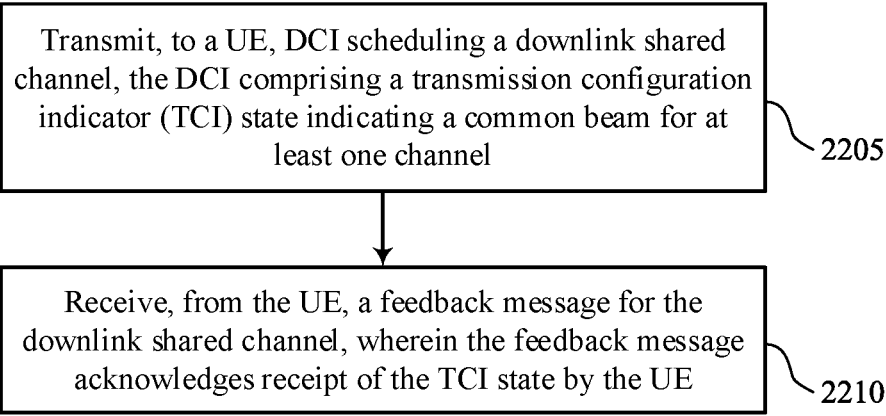

FIG. 22 shows a flowchart illustrating a method 2200 that supports DCI based unified TCI acknowledgement in accordance with aspects of the present disclosure. The operations of the method 2200 may be implemented by a base station or its components as described herein. For example, the operations of the method 2200 may be performed by a base station 105 as described with reference to FIGS. 1 through 7 and 12 through 15. In some examples, a base station may execute a set of instructions to control the functional elements of the base station to perform the described functions. Additionally, or alternatively, the base station may perform aspects of the described functions using special-purpose hardware.

At 2205, the method may include transmitting, to a UE, DCI scheduling a downlink shared channel, the DCI including a TCI state indicating a common beam for at least one channel. The operations of 2205 may be performed in accordance with examples as disclosed herein. In some examples, aspects of the operations of 2205 may be performed by a DCI transmission component 1425 as described with reference to FIG. 14.

At 2210, the method may include receiving, from the UE, a feedback message for the downlink shared channel, where the feedback message acknowledges receipt of the TCI state by the UE. The operations of 2210 may be performed in accordance with examples as disclosed herein. In some examples, aspects of the operations of 2210 may be performed by a feedback receiving component 1430 as described with reference to FIG. 14.

SUMMARY OF ASPECTS

The following provides an overview of aspects of the present disclosure:

Aspect 1: A method for wireless communications at a UE, comprising: receiving, from a base station, DCI scheduling a downlink shared channel, the DCI comprising a TCI state indicating a common beam for at least one channel; transmitting, to the base station, a feedback message for the downlink shared channel, wherein the feedback message acknowledges receipt of the TCI state; and applying the TCI state after transmitting the feedback message acknowledging the receipt of the TCI state.

Aspect 2: The method of aspect 1, further comprising: determining that a payload of the downlink shared channel comprises a single transport block; and transmitting, to the base station, a single positive ACK bit for the downlink shared channel to acknowledge the receipt of the TCI state based at least in part on the determining.

Aspect 3: The method of any of aspects 1 through 2, further comprising: determining that a payload of the downlink shared channel comprises more than one transport block; and transmitting, to the base station, at least one positive ACK bit for the downlink shared channel to acknowledge the receipt of the TCI state based at least in part on the determining.

Aspect 4: The method of any of aspects 1 through 3, further comprising: determining that the downlink shared channel is configured with one or more code block groups; and transmitting, to the base station, at least one positive ACK bit for the downlink shared channel to acknowledge the receipt of the TCI state based at least in part on the determining.

Aspect 5: The method of any of aspects 1 through 4, further comprising: generating the feedback message as an enhanced ACK message, the enhanced ACK message comprising a set of positive ACK bits; and transmitting, to the base station, the enhanced ACK message to acknowledge the receipt of the TCI state based at least in part on the generating.

Aspect 6: The method of aspect 5, wherein the enhanced ACK message is associated with an HARQ type II codebook.

Aspect 7: The method of any of aspects 1 through 6, further comprising: receiving, from the base station via a radio resource control message, an indication that the feedback message for the downlink shared channel comprises a set of ACK bits and an additional set of padded bits to acknowledge the receipt of the TCI state.

Aspect 8: The method of aspect 7, wherein a payload of the downlink shared channel comprises a single transport block comprising one or more code block groups, wherein transmitting the feedback message further comprises: allocating the additional set of padded bits to a portion of a codebook for the downlink shared channel, the additional set of padded bits indicating a positive ACK value; and transmitting, to the base station, at least the additional set of padded bits allocated to the portion of the codebook to acknowledge the receipt of the TCI state.

Aspect 9: The method of any of aspects 7 through 8, wherein a payload of the downlink shared channel comprises more than one transport block, the method further comprising: transmitting, to the base station, a first positive ACK bit for a first transport block, the first positive ACK bit indicating the receipt of the downlink shared channel; and transmitting, to the base station, a second positive ACK bit for a second transport block, the second positive ACK bit indicating the receipt of both the downlink shared channel and the DCI.

Aspect 10: The method of any of aspects 1 through 9, further comprising: generating a single positive ACK bit dedicated for the DCI in accordance with an HARQ type I codebook; and transmitting, to the base station, the feedback message comprising the single positive ACK bit to acknowledge the receipt of the TCI state based at least in part on the generating.

Aspect 11: The method of any of aspects 1 through 10, further comprising: transmitting the feedback message to the base station using a set of uplink control channel resources associated with the downlink shared channel, wherein the feedback message comprises a first acknowledgement of the downlink shared channel and a second acknowledgement of the receipt of the TCI state; and applying the TCI state after transmitting the feedback message, wherein the feedback message indicates the receipt of the TCI state.

Aspect 12: The method of aspect 11, wherein the set of uplink control channel resources is configured with a set of HARQ bits for transmitting the feedback message associated with the downlink shared channel.

Aspect 13: The method of any of aspects 11 through 12, wherein the set of uplink control channel resources is indicated by the DCI.

Aspect 14: The method of any of aspects 1 through 13, wherein the DCI is received after at least one other DCI, and wherein transmitting the feedback message further comprises: determining that the TCI state indicating the common beam is included in the DCI; identifying a set of uplink control channel resources in the DCI for transmitting the feedback message based at least in part on the DCI including the TCI state; and transmitting the feedback message to the base station using the set of uplink control channel resources to acknowledge the receipt of the TCI state.

Aspect 15: The method of aspect 14, further comprising: determining that the TCI state indicating the common beam is included in the DCI and the at least one other DCI; and transmitting the feedback message to the base station using the set of uplink control channel resources to acknowledge the receipt of the TCI state, or using a separate set of uplink control channel resources to acknowledge the receipt of the at least one other DCI.

Aspect 16: The method of any of aspects 14 through 15, wherein the TCI state indicating the common beam is included in the DCI based at least in part on the DCI being received after the at least one other DCI.

Aspect 17: The method of any of aspects 1 through 16, wherein the TCI state indicates a joint indication or separate indications for the at least one channel.

Aspect 18: The method of any of aspects 1 through 17, wherein the TCI state indicating the common beam comprises a layer-1 based beam indication.

Aspect 19: A method for wireless communications at a base station, comprising: transmitting, to a UE, DCI scheduling a downlink shared channel, the DCI comprising a transmission configuration indicator (TCI) state indicating a common beam for at least one channel; receiving, from the UE, a feedback message for the downlink shared channel, wherein the feedback message acknowledges receipt of the TCI state by the UE.

Aspect 20: The method of aspect 19, further comprising: transmitting the downlink shared channel in a single transport block; and receiving, from the UE, a single positive ACK bit for the downlink shared channel acknowledging the receipt of the TCI state based at least in part on the transmitting.

Aspect 21: The method of any of aspects 19 through 20, further comprising: transmitting the downlink shared channel in more than one transport block; and receiving, by the UE, at least one positive ACK bit for the downlink shared channel acknowledging the receipt of the TCI state based at least in part on the transmitting.

Aspect 22: The method of any of aspects 19 through 21, further comprising: transmitting the downlink shared channel in one or more code block groups; and receiving, from the UE, at least one positive ACK bit for the downlink shared channel acknowledging the receipt of the TCI state based at least in part on the transmitting.

Aspect 23: The method of any of aspects 19 through 22, further comprising: receiving, from the UE, the feedback message as an enhanced ACK message comprising a set of positive ACK bits, wherein the enhanced ACK message acknowledges the receipt of the TCI state.

Aspect 24: The method of aspect 23, wherein the enhanced ACK message is associated with an HARQ type II codebook.

Aspect 25: The method of any of aspects 19 through 24, further comprising: transmitting, to UE via a radio resource control message, an indication that the feedback message for the downlink shared channel comprises a set of ACK bits and an additional set of padded bits to acknowledge the receipt of the TCI state.

Aspect 26: The method of aspect 25, wherein a payload of the downlink shared channel comprises a single transport block comprising one or more code block groups, wherein receiving the feedback message further comprises: receiving, from the UE, the additional set of padded bits in a portion of a codebook for the downlink shared channel, the additional set of padded bits indicating a positive ACK value acknowledging the receipt of the TCI state.

Aspect 27: The method of any of aspects 25 through 26, wherein a payload of the downlink shared channel comprises more than one transport block, the method further comprising: receiving, from the UE, a first positive ACK bit for a first transport block, the first positive ACK bit indicating the receipt of the downlink shared channel; and receiving, from the UE, a second positive ACK bit for a second transport block, the second positive ACK bit indicating the receipt of both the downlink shared channel and the DCI.

Aspect 28: The method of any of aspects 19 through 27, further comprising: receiving, from the UE, the feedback message comprising a single positive ACK bit dedicated for the DCI in accordance with an HARQ type I codebook, wherein the single positive ACK bit acknowledges receipt of the TCI state.

Aspect 29: The method of any of aspects 19 through 28, further comprising: receiving the feedback message from the UE on a set of uplink control channel resources associated with the downlink shared channel, wherein the feedback message comprises a first acknowledgement of the downlink shared channel and a second acknowledgement of the receipt of the TCI state.

Aspect 30: The method of aspect 29, wherein the set of uplink control channel resources is configured with a set of HARQ bits for transmitting the feedback message associated with the downlink shared channel.

Aspect 31: The method of any of aspects 29 through 30, wherein the set of uplink control channel resources is indicated by the DCI.

Aspect 32: The method of any of aspects 19 through 31, wherein the DCI is transmitted after at least one other DCI, and wherein receiving the feedback message further comprises: transmitting, in the DCI, the TCI state indicating the common beam and an indication of a set of uplink control channel resources for the feedback message based at least in part on the DCI including the TCI state; and receiving the feedback message from the UE to acknowledge the receipt of the TCI state on the set of uplink control channel resources.

Aspect 33: The method of aspect 32, further comprising: transmitting the TCI state indicating the common beam in the DCI and the at least one other DCI; and receiving the feedback message from the UE on the set of uplink control channel resources to acknowledge the receipt of the TCI state, or on a separate set of uplink control channel resources to acknowledge the receipt of the at least one other DCI.

Aspect 34: The method of any of aspects 32 through 33, wherein the TCI state indicating the common beam is included in the DCI based at least in part on the DCI being transmitted after the at least one other DCI.

Aspect 35: The method of any of aspects 19 through 34, wherein the TCI state indicates a joint indication or separate indications for the at least one channel.

Aspect 36: The method of any of aspects 19 through 35, wherein the TCI state indicating the common beam comprises a layer-1 based beam indication.

Aspect 37: An apparatus for wireless communications at a UE, comprising a processor; memory coupled with the processor; and instructions stored in the memory and executable by the processor to cause the apparatus to perform a method of any of aspects 1 through 18.

Aspect 38: An apparatus for wireless communications at a UE, comprising at least one means for performing a method of any of aspects 1 through 18.

Aspect 39: A non-transitory computer-readable medium storing code for wireless communications at a UE, the code comprising instructions executable by a processor to perform a method of any of aspects 1 through 18.

Aspect 40: An apparatus for wireless communications at a base station, comprising a processor; memory coupled with the processor; and instructions stored in the memory and executable by the processor to cause the apparatus to perform a method of any of aspects 19 through 36.

Aspect 41: An apparatus for wireless communications at a base station, comprising at least one means for performing a method of any of aspects 19 through 36.

Aspect 42: A non-transitory computer-readable medium storing code for wireless communications at a base station, the code comprising instructions executable by a processor to perform a method of any of aspects 19 through 36.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:

receiving downlink control information (DCI) scheduling a downlink shared channel, the DCI comprising a transmission configuration indicator (TCI) state indicating a common beam for at least one channel;

transmitting a feedback message for the downlink shared channel, wherein the feedback message acknowledges receipt of the TCI state; and applying the TCI state after termination of a beam application time, and based at least in part on transmission of the feedback message acknowledging the receipt of the TCI state, the beam application time being based at least in part on a beam switch indicated by the TCI state.

2. The method of claim 1, further comprising:

determining that a payload of the downlink shared channel comprises a single transport block; and transmitting a single positive acknowledgement bit for the downlink shared channel to acknowledge the receipt of the TCI state based at least in part on the determining.

3. The method of claim 1, further comprising:

determining that a payload of the downlink shared channel comprises more than one transport block; and transmitting at least one positive acknowledgement bit for the downlink shared channel to acknowledge the receipt of the TCI state based at least in part on the determining.

4. The method of claim 1, further comprising:

determining that the downlink shared channel is configured with one or more code block groups; and transmitting at least one positive acknowledgement bit for the downlink shared channel to acknowledge the receipt of the TCI state based at least in part on the determining.

5. The method of claim 1, further comprising:

generating the feedback message as an enhanced acknowledgement message, the enhanced acknowledgement message comprising a set of positive acknowledgement bits; and transmitting the enhanced acknowledgement message to acknowledge the receipt of the TCI state based at least in part on the generating.

6. The method of claim 5, wherein the enhanced acknowledgement message is associated with a hybrid automatic repeat request (HARQ) type II codebook.

7. The method of claim 1, further comprising:

receiving, via a radio resource control message, an indication that the feedback message for the downlink shared channel comprises a set of acknowledgement bits and an additional set of padded bits to acknowledge the receipt of the TCI state.

8. The method of claim 7, wherein a payload of the downlink shared channel comprises a single transport block comprising one or more code block groups, wherein transmitting the feedback message further comprises:

allocating the additional set of padded bits to a portion of a codebook for the downlink shared channel, the additional set of padded bits indicating a positive acknowledgement value; and transmitting at least the additional set of padded bits allocated to the portion of the codebook to acknowledge the receipt of the TCI state.

9. The method of claim 7, wherein a payload of the downlink shared channel comprises more than one transport block, the method further comprising:

transmitting a first positive acknowledgement bit for a first transport block, the first positive acknowledgement bit indicating the receipt of the downlink shared channel; and transmitting a second positive acknowledgement bit for a second transport block, the second positive acknowledgement bit indicating the receipt of both the downlink shared channel and the DCI.

10. The method of claim 1, further comprising:

generating a single positive acknowledgement bit dedicated for the DCI in accordance with a hybrid automatic repeat request (HARQ) type I codebook; and transmitting the feedback message comprising the single positive acknowledgement bit to acknowledge the receipt of the TCI state based at least in part on the generating.

11. The method of claim 1, further comprising:

transmitting the feedback message using a set of uplink control channel resources associated with the downlink shared channel, wherein the feedback message comprises a first acknowledgement of the downlink shared channel and a second acknowledgement of the receipt of the TCI state, wherein the feedback message indicates the receipt of the TCI state.

12. The method of claim 11, wherein the set of uplink control channel resources is configured with a set of hybrid automatic repeat request (HARQ) bits for transmitting the feedback message associated with the downlink shared channel.

13. The method of claim 11, wherein the set of uplink control channel resources is indicated by the DCI.

14. The method of claim 1, wherein the DCI is received after at least one other DCI, and wherein transmitting the feedback message further comprises:

determining that the TCI state indicating the common beam is included in the DCI;

identifying a set of uplink control channel resources in the DCI for transmitting the feedback message based at least in part on the DCI including the TCI state; and transmitting the feedback message using the set of uplink control channel resources to acknowledge the receipt of the TCI state.

15. The method of claim 14, further comprising:

determining that the TCI state indicating the common beam is included in the DCI and the at least one other DCI; and transmitting the feedback message using the set of uplink control channel resources to acknowledge the receipt of the TCI state, or using a separate set of uplink control channel resources to acknowledge the receipt of the at least one other DCI.

16. The method of claim 14, wherein the TCI state indicating the common beam is included in the DCI based at least in part on the DCI being received after the at least one other DCI.

17. The method of claim 1, wherein the TCI state indicates a joint indication or separate indications for the at least one channel.

18. The method of claim 1, wherein the TCI state indicating the common beam comprises a layer 1 based beam indication.

19. A method for wireless communications at a network device, comprising:

transmitting, to a user equipment (UE), downlink control information (DCI) scheduling a downlink shared channel, the DCI comprising a transmission configuration indicator (TCI) state indicating a common beam for at least one channel; and receiving, from the UE, a feedback message for the downlink shared channel, wherein the feedback message acknowledges receipt of the TCI state by the UE, wherein the TCI state is applicable after termination of a beam application time, the beam application time being based at least in part on a beam switch indicated by the TCI state.

20. The method of claim 19, further comprising:

transmitting the downlink shared channel in a single transport block; and receiving, from the UE, a single positive acknowledgement bit for the downlink shared channel acknowledging the receipt of the TCI state based at least in part on the transmitting.

21. The method of claim 19, further comprising:

transmitting the downlink shared channel in more than one transport block; and receiving, by the UE, at least one positive acknowledgement bit for the downlink shared channel acknowledging the receipt of the TCI state based at least in part on the transmitting.

22. The method of claim 19, further comprising:

transmitting the downlink shared channel in one or more code block groups; and receiving, from the UE, at least one positive acknowledgement bit for the downlink shared channel acknowledging the receipt of the TCI state based at least in part on the transmitting.

23. The method of claim 19, further comprising:

transmitting, to UE via a radio resource control message, an indication that the feedback message for the downlink shared channel comprises a set of acknowledgement bits and an additional set of padded bits to acknowledge the receipt of the TCI state.

24. The method of claim 23, wherein a payload of the downlink shared channel comprises a single transport block comprising one or more code block groups, wherein receiving the feedback message further comprises:

receiving, from the UE, the additional set of padded bits in a portion of a codebook for the downlink shared channel, the additional set of padded bits indicating a positive acknowledgement value acknowledging the receipt of the TCI state.

25. The method of claim 23, wherein a payload of the downlink shared channel comprises more than one transport block, the method further comprising:

receiving, from the UE, a first positive acknowledgement bit for a first transport block, the first positive acknowledgement bit indicating the receipt of the downlink shared channel; and receiving, from the UE, a second positive acknowledgement bit for a second transport block, the second positive acknowledgement bit indicating the receipt of both the downlink shared channel and the DCI.

26. The method of claim 19, further comprising:

receiving, from the UE, the feedback message comprising a single positive acknowledgement bit dedicated for the DCI in accordance with a hybrid automatic repeat request (HARQ) type I codebook, wherein the single positive acknowledgement bit acknowledges receipt of the TCI state.

27. The method of claim 19, further comprising:

receiving the feedback message from the UE on a set of uplink control channel resources associated with the downlink shared channel, wherein the feedback message comprises a first acknowledgement of the downlink shared channel and a second acknowledgement of the receipt of the TCI state.

28. The method of claim 27, wherein the set of uplink control channel resources is configured with a set of hybrid automatic repeat request (HARQ) bits for transmission of the feedback message associated with the downlink shared channel.

29. The method of claim 27, wherein the set of uplink control channel resources is indicated by the DCI.

30. The method of claim 19, wherein the DCI is transmitted after at least one other DCI, and wherein receiving the feedback message further comprises:

transmitting, in the DCI, the TCI state indicating the common beam and an indication of a set of uplink control channel resources for the feedback message based at least in part on the DCI including the TCI state; and receiving the feedback message from the UE to acknowledge the receipt of the TCI state on the set of uplink control channel resources.

31. The method of claim 30, further comprising:

transmitting the TCI state indicating the common beam in the DCI and the at least one other DCI; and receiving the feedback message from the UE on the set of uplink control channel resources to acknowledge the receipt of the TCI state, or on a separate set of uplink control channel resources to acknowledge the receipt of the at least one other DCI.

32. The method of claim 30, wherein the TCI state indicating the common beam is included in the DCI based at least in part on the DCI being transmitted after the at least one other DCI.

33. An apparatus for wireless communications at a user equipment (UE), comprising:

at least one processor;

at least one memory coupled with the at least one processor; and instructions stored in the at least one memory and executable by the at least one processor to cause the apparatus to:

receive downlink control information (DCI) scheduling a downlink shared channel, the DCI comprising a transmission configuration indicator (TCI) state indicating a common beam for at least one channel;

transmit a feedback message for the downlink shared channel, wherein the feedback message acknowledges receipt of the TCI state; and apply the TCI state after termination of a beam application time, and based at least in part on transmission of the feedback message acknowledging the receipt of the TCI state, the beam application time being based at least in part on a beam switch indicated by the TCI state.

34. An apparatus for wireless communications at a network device, comprising:

at least one processor;

at least one memory coupled with the at least one processor; and instructions stored in the at least one memory and executable by the at least one processor to cause the apparatus to:

transmit, to a user equipment (UE), downlink control information (DCI) scheduling a downlink shared channel, the DCI comprising a transmission configuration indicator (TCI) state indicating a common beam for at least one channel; and receive, from the UE, a feedback message for the downlink shared channel, wherein the feedback message acknowledges receipt of the TCI state by the UE, wherein the TCI state is applicable after termination of a beam application time, the beam application time being based at least in part on a beam switch indicated by the TCI state.

35. An apparatus for wireless communications at a user equipment (UE), comprising:

means for receiving downlink control information (DCI) scheduling a downlink shared channel, the DCI comprising a transmission configuration indicator (TCI) state indicating a common beam for at least one channel;

means for transmitting a feedback message for the downlink shared channel, wherein the feedback message acknowledges receipt of the TCI state; and means for applying the TCI state after termination of a beam application time, and based at least in part on transmission of the feedback message acknowledging the receipt of the TCI state, the beam application time being based at least in part on a beam switch indicated by the TCI state.

* * * * *